United States Patent
Elian et al.

(10) Patent No.: US 12,079,431 B1
(45) Date of Patent: Sep. 3, 2024

(54) ULTRASONIC TOUCH SENSOR WITH BACKLIGHT

(71) Applicant: Infineon Technologies AG, Neubiberg (DE)

(72) Inventors: Klaus Elian, Alteglofsheim (DE); Derek Debie, Bogen (DE); Fabian Streb, Regensburg (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/466,476

(22) Filed: Sep. 13, 2023

(51) Int. Cl.
| | |
|---|---|
| *G06F 3/043* | (2006.01) |
| *B06B 1/02* | (2006.01) |
| *B06B 1/06* | (2006.01) |
| *F21K 9/64* | (2016.01) |
| *F21V 9/40* | (2018.01) |
| *F21V 23/04* | (2006.01) |
| *F21Y 103/10* | (2016.01) |
| *F21Y 107/90* | (2016.01) |
| *F21Y 113/13* | (2016.01) |
| *F21Y 115/10* | (2016.01) |

(52) U.S. Cl.
CPC .......... *G06F 3/0436* (2013.01); *B06B 1/0292* (2013.01); *B06B 1/0666* (2013.01); *F21K 9/64* (2016.08); *F21V 9/40* (2018.02); *F21V 23/0485* (2013.01); *B06B 2201/55* (2013.01); *F21Y 2103/10* (2016.08); *F21Y 2107/90* (2016.08); *F21Y 2113/13* (2016.08); *F21Y 2115/10* (2016.08)

(58) Field of Classification Search
CPC ............... H10K 59/40; G06V 40/1306; G06V 40/1318; G06F 3/0412
USPC ........................................................ 345/174
See application file for complete search history.

(56) References Cited

U.S. PATENT DOCUMENTS

| | | | |
|---|---|---|---|
| 2020/0184176 A1* | 6/2020 | Liu | H10K 59/65 |
| 2020/0279087 A1* | 9/2020 | Seo | G01S 7/52079 |

\* cited by examiner

*Primary Examiner* — Calvin C Ma
(74) *Attorney, Agent, or Firm* — Harrity & Harrity, LLP

(57) ABSTRACT

An ultrasonic touch sensor includes a housing having a package cavity; an ultrasonic transmitter arranged within the package cavity, and configured to transmit an ultrasonic transmit wave; an ultrasonic receiver arranged within the package cavity, and configured to receive an ultrasonic reflected wave produced by a reflection of the ultrasonic transmit wave and generate a measurement signal representative of the ultrasonic reflected wave; a measurement circuit arranged within the package cavity and coupled to the ultrasonic receiver, and configured to detect a touch or a non-touch based on the measurement signal; a light source configured to produce an activating light; and a coupling medium that fills or at least partially fills the package cavity. The coupling medium includes a luminescent material that is configured to be activated by the activating light to produce a backlight that is emitted from the package cavity.

25 Claims, 7 Drawing Sheets

ULTRASONIC TOUCH SENSOR WITH BACKLIGHT

BACKGROUND

Touch sensing through metal surfaces using ultrasound waves is currently being investigated as an alternative to capacitive touch sensing. Ultrasonic sensing relies on a transmission of an ultrasound wave directed at a touch structure, and reception and processing of a reflected waveform that is reflected back from the touch structure. A characteristic of the reflected waveform will depend on an existence or a non-existence of a touch event, and can be used to discriminate between the existence or the non-existence of the touch event.

SUMMARY

In some implementations, an ultrasonic touch sensor includes a housing having a package cavity; an ultrasonic transmitter arranged within the package cavity, wherein the ultrasonic transmitter is configured to transmit an ultrasonic transmit wave; an ultrasonic receiver arranged within the package cavity, wherein the ultrasonic receiver is configured to receive an ultrasonic reflected wave produced by a reflection of the ultrasonic transmit wave and generate a measurement signal representative of the ultrasonic reflected wave; a measurement circuit arranged within the package cavity and coupled to the ultrasonic receiver, wherein the measurement circuit is configured to detect a touch or a non-touch based on the measurement signal; a light source configured to produce an activating light; and a coupling medium that at least partially fills the package cavity, wherein the coupling medium includes a luminescent material that is configured to be activated by the activating light to produce a backlight that is emitted from the package cavity.

In some implementations, an ultrasonic touch system includes a housing having a first package cavity and a second package cavity; a first ultrasonic transmitter arranged within the first package cavity; a first ultrasonic receiver arranged within the first package cavity and acoustically coupled to the first ultrasonic transmitter; a second ultrasonic transmitter arranged within the second package cavity; a second ultrasonic receiver arranged within the second package cavity and acoustically coupled to the second ultrasonic transmitter; a first activating light source configured to produce a first activating light; a first coupling medium that at least partially fills the first package cavity, wherein the first coupling medium includes a first luminescent material that is configured to be activated by the first activation light to produce a first backlight that is emitted from the first package cavity; and a second coupling medium that at least partially fills the second package cavity, wherein the second coupling medium includes a second luminescent material that is configured to be activated by the first activating light to produce a second backlight that is emitted from the second package cavity.

In some implementations, an ultrasonic touch sensor includes a touch structure arranged over a package cavity, wherein the touch structure comprises a touch surface and an interior surface; a flexible circuit substrate having a frontside coupled to the interior surface of the touch structure and a backside; an ultrasonic transmitter coupled to the backside of the flexible circuit substrate and configured to transmit an ultrasonic transmit wave toward the touch structure; an ultrasonic receiver coupled to the backside of the flexible circuit substrate and configured to receive an ultrasonic reflected wave produced by a reflection of the ultrasonic transmit wave at the touch structure and generate a measurement signal representative of the ultrasonic reflected wave; a measurement circuit coupled to the backside of the flexible circuit substrate and coupled to the ultrasonic receiver, wherein the measurement circuit is configured to detect a touch or a non-touch based on the measurement signal; a light source coupled to the backside of the flexible circuit substrate and configured to produce an activating light; and a coupling medium that at least partially fills the package cavity, wherein the coupling medium couples the ultrasonic transmitter and the ultrasonic receiver to the touch structure, and wherein the coupling medium includes a luminescent material that is configured to be activated by the activating light to produce a backlight that is emitted from the package cavity.

BRIEF DESCRIPTION OF THE DRAWINGS

Implementations are described herein with reference to the appended drawings.

DETAILED DESCRIPTION

Figure 1:
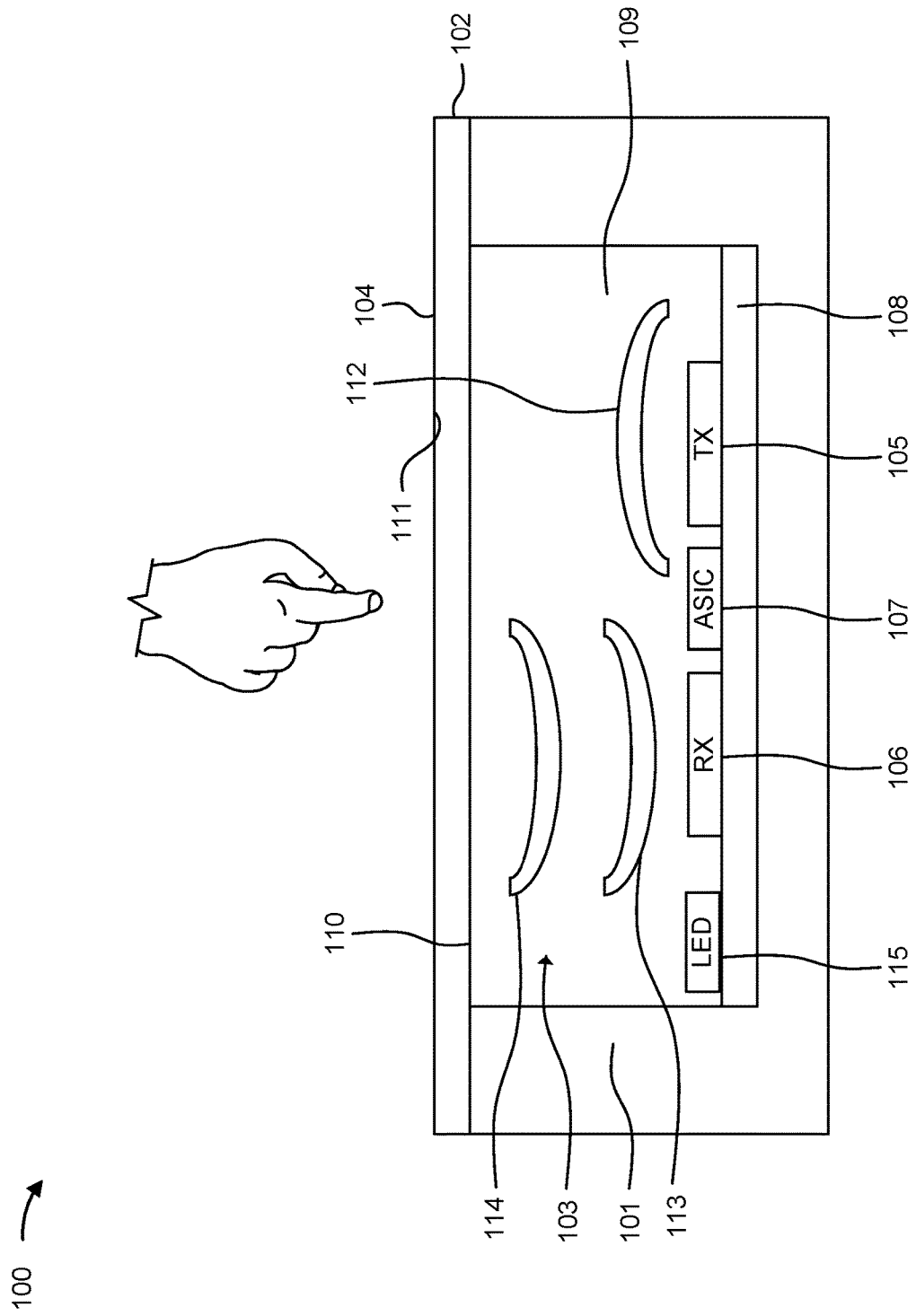
FIG. 1 illustrates an ultrasonic touch sensor according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

"Sensor" may refer to a component which converts a property to be measured to an electrical signal (e.g., a current signal or a voltage signal). The property to be measured may, for example, comprise a magnetic field, an electric field, an electromagnetic wave (e.g., a radio wave), a pressure, a force, a current, or a voltage, but is not limited thereto. For an ultrasonic touch sensor, the property to be measured is an ultrasound wave produced, for example, by a microelectromechanical system (MEMS) transducer. The ultrasound wave may be directed at a touch structure, where the ultrasound wave is reflected back by the touch structure as a reflected ultrasound wave. The reflected ultrasound wave can be used for sensing touch (e.g., a touch event) at a touch surface of the touch structure. Specifically, the ultrasonic touch sensor can use the reflected ultrasound wave to discriminate between an existence of the touch event or a non-existence of the touch event (e.g., a no-touch event).

Ultrasonic touch sensors have a touch structure with a touch surface that is sensitive to touches. However, the touch surface can be difficult to see in dark and low-light environments, which can make it difficult to locate the touch surface.

Some implementations disclosed herein are directed to an ultrasonic touch sensor that includes an acoustic coupling gel arranged inside a package cavity of the ultrasonic touch sensor. The acoustic coupling gel includes a luminescent material. The ultrasonic touch sensor also includes a light source (e.g., an activating light source) that produces an activating light for activating the luminescent material within the acoustic coupling gel to produce a backlight. Thus, the acoustic coupling gel is configured to be activated by the activating light to produce the backlight, and the backlight is emitted from the package cavity in order to make the touch surface more readily identifiable. For example, the touch structure may be optically transparent or may include an optically transparent region that is transparent to the backlight such that the backlight is emitted from the ultrasonic touch sensor through the touch structure. By switching on the light source, the acoustic coupling gel emits the backlight, which may serve as a position indicator for the ultrasonic touch sensor.

FIG. 1 illustrates an ultrasonic touch sensor 100 according to one or more implementations. The ultrasonic touch sensor 100 includes a housing comprising a frame 101 and a touch structure 102 (e.g., a touch substrate) that form a package cavity 103. The frame 101 may be made of an encapsulant, such as overmolded thermoplastic or another type of molding material. As part of the housing, the frame 101 may have a recess that becomes the package cavity 103 when the touch structure 102 encloses the recess. In some implementations, part of the frame 101 may extend into and fill the package cavity 103, thereby covering one or more sensor components arranged therein. Epoxy or some other ultrasound-compatible material cast in the recess may be used. An area of the housing in which ultrasonic transducers reside may be referred to as an acoustic port, an ultrasound port, an acoustic chamber, or an ultrasound chamber, among other examples.

The touch structure 102 may be used as a lid or a package cover that rests upon a touch side of the ultrasonic touch sensor 100. In the example shown, the package cavity 103 is an internal area that is formed by the enclosure of the frame 101 and the touch structure 102. The touch structure 102 may be made of one or more metal layers, one or more plastic layers, and/or one or more layers of another solid material. Thus, the touch structure 102 may be a covering coupled to the frame 101, and the package cavity 103 may be an internal area that is defined, at least in part, by the touch structure 102 (e.g., an internal area defined between the frame 101 and the touch structure 102). The touch structure 102 includes a touch surface 104 at the touch structure's external interface with an environment. The touch surface 104 is arranged and operable to receive contact (e.g., touches) from a user that can be detected by sensor circuitry.

In some implementations, lateral sides of the frame 101 may be at least partially open, such that the package cavity 103 is not a fully enclosed volume. For example, the lateral sides of the frame 101 may include columns that support the touch structure 102, and/or the touch structure 102 may be supported by a coupling medium, such as a film layer, a silicone gel, or a soft epoxy. For example, the coupling medium may be provided in the package cavity 103 and may be mechanically coupled to and between a circuit substrate at a bottom side of the package cavity 103 and the touch structure 102 at a top side of the package cavity 103 to provide support to the touch structure 102. In some implementations, the lateral sides of the package cavity 103 may be fully open, with the lateral sides of the frame 101 being absent, and the touch structure 102 may be partially or fully supported by the coupling medium. Thus, the coupling medium may be sufficiently rigid to support the touch structure 102 in cases in which the lateral sides of the package cavity 103 are fully open.

The package cavity 103 contains sensor circuitry used for detecting no-touch events and touch events at the touch surface 104. A touch event is an instance when a user makes contact with the touch surface 104, and a no-touch event is any other circumstance, including the occurrence of disturbing influences (e.g., error sources) that may occur in the absence of a touch event. The sensor circuitry is configured to distinguish between a touch event and a no-touch event, taking into account possible errors originating from the disturbing influences.

An ultrasound wave is a sound wave having a frequency of 20 kHz or higher. An ultrasound wave may be referred to as an ultrasonic transmit wave when the ultrasound wave is transmitted by a transmitter, and may be referred to as an ultrasonic reflected wave when the ultrasound wave has been reflected by the touch structure 102 for reception at a receiver. The sensor circuitry includes a transmitter (TX) 105 configured to transmit ultrasound waves (e.g., ultrasonic transmit waves), a receiver (RX) 106 configured to receive reflected ultrasound waves (e.g., ultrasonic reflected waves), and a sensor circuit 107 (e.g., an application specific integrated circuit (ASIC)). The sensor circuit 107 may be configured to generate the ultrasound waves for transmission by the transmitter 105, and perform signal processing on the reflected ultrasound waves received by the receiver 106. In some implementations, the sensor circuit 107 may be configured to evaluate the reflected ultrasound waves to detect no-touch events and touch events by applying a first touch detection algorithm, and to control one or more components of the ultrasonic touch sensor 100, including the transmitter 105, the receiver 106, or any signal processing components of a signal processing chain of the sensor circuit 107. In some implementations, the sensor circuit 107 may evaluate an additional property of the ultrasonic touch sensor 100 (e.g., an internal pressure, a bias voltage, or a cross-coupling effect) from which a measurement signal is obtained and evaluated for detecting the no-touch events and the touch events by applying a second touch detection algorithm. In some implementations, both the first touch detection algorithm and the second touch detection algorithm may be used in combination for detecting the no-touch events and the touch events.

The transmitter 105 and the receiver 106 may both be sound transducers with a flexible membrane that vibrates to either produce sound waves, in the case of the transmitter 105, or in response to receiving sound waves, in the case of the receiver 106. In particular, the transmitter 105 and the receiver 106 may be capacitive micromachined ultrasonic transducers (CMUTs) or piezoelectric micromachined ultrasonic transducers (PMUTs). In some implementations, the transmitter 105 and the receiver 106 may be combined into a single transceiver transducer that has a single flexible membrane.

A CMUT is a MEMS transducer where an energy transduction is due to a change in capacitance. CMUTs are constructed on silicon using micromachining techniques. A cavity may be formed in a silicon substrate, which serves as a first electrode of a capacitor. A thin layer suspended on a top of the cavity serves as the flexible membrane on which a conductive layer acts a second electrode of the capacitor. The first electrode and the second electrode of the capacitor are biased with a bias voltage (e.g., a DC bias voltage) that establishes an initial operating condition of the MEMS transducer. Accordingly, the first electrode and the second electrode of the capacitor may be referred to as biased electrodes.

When an AC signal is applied across the biased electrodes of the capacitor, the AC signal is superimposed onto the bias voltage. As a result, the flexible membrane will vibrate and produce ultrasound waves in a medium of interest. In this way, the CMUT works as a transmitter. The sensor circuit 107 is configured to generate an excitation signal (e.g., an acoustical stimulation signal) and transmit the excitation signal to the transmitter 105. The excitation signal is applied across the biased electrodes, causing the flexible membrane to vibrate according to the waveform of the excitation signal and produce a corresponding ultrasound wave. Different excitation signals induce different ultrasound waves. Accordingly, the excitation signal is a signal applied to the transmitter 105 by the sensor circuit 107 to produce an ultrasound wave that is used to detect touch events at the touch surface 104 of the touch structure 102 as well as the applied force thereof. Thus, the sensor circuit 107 may include a signal generator that is configured to generate an excitation signal for producing an ultrasonic wave. The transmitter 105 is configured to receive the excitation signal from the signal generator and transmit the ultrasonic wave based on the excitation signal.

On the other hand, when an ultrasound wave is applied to (e.g., received by) the flexible membrane of a biased CMUT, the flexible membrane will vibrate according to the applied ultrasound wave and the CMUT will generate an alternating signal (e.g., a measurement signal) as the capacitance is varied. In this way, the alternating signal is a measurement signal representative of received ultrasound waves and the CMUT operates as a receiver of the ultrasound waves. It is also possible that each MEMS transducer is configurable as a transceiver that is capable of both transmitting and receiving ultrasound waves.

PMUTs are MEMS-based piezoelectric ultrasonic transducers. A PMUT may include a thin-film piezoelectric membrane sandwiched between two electrodes (e.g., top and bottom electrodes), and a passive elastic layer. While an alternating electric field is applied between the top and bottom electrodes, the thin-film piezoelectric membrane starts to expand and contract in a lateral dimension due to the inverse piezoelectric effect and the PMUT operating in a transmitting mode. Because the thin-film piezoelectric membrane is clamped and suspended on top of the package cavity 103, clamped sides of the thin-film piezoelectric membrane act as a boundary condition that will force the thin-film piezoelectric membrane to vibrate in a vertical direction during its expansion and contraction in the lateral dimension. As a result, an ultrasonic transmit wave is produced. In contrast, when operating in a receiving mode, the PMUT receives an external vibration, which causes electric charges to accumulate on a part of an outer surface of the thin-film piezoelectric membrane that is in contact with an electrode. The electric charges can be detected by the sensor circuit 107.

The transmitter 105, the receiver 106, and the sensor circuit 107 may be arranged on a circuit substrate 108 (e.g., a leadframe or a printed circuit board (PCB)) that is disposed at a base of the frame 101. The circuit substrate 108 is configured to electrically couple the sensor circuit 107 to both the transmitter 105 and the receiver 106. The transmitter 105, the receiver 106, and the sensor circuit 107 may be separate integrated circuits (ICs) (e.g., dies) or may be combined in any combination into one or two ICs. Additionally, both the transmitter 105 and the receiver 106 may be implemented as separate transceivers such that two transmitters and two receivers are provided.

A remaining portion of the package cavity 103 may be filled with a coupling medium 109, such as a silicone gel, a soft epoxy, a liquid, or any other material that enables the propagation of ultrasonic waves with no, or substantially no, attenuation. Thus, the coupling medium 109 may provide acoustic (e.g., ultrasound) coupling between the transmitter 105 and the receiver 106 with no, or substantially no, attenuation. In some implementations, the material of the coupling medium 109 is also configured to provide elastic coupling to the receiver 106 and the touch structure 102 such that the receiver 106 and the touch structure 102 are mechanically coupled by the coupling medium 109. When providing mechanical coupling between the touch structure 102 and the receiver 106, the coupling medium 109 is a non-gaseous medium. In some implementations, the coupling medium 109 may provide structural support to the touch structure 102 (e.g., in instances when the lateral sides of the package cavity 103 are fully open).

The touch structure 102 has a first interface 110 and a second interface 111 that interact with ultrasound waves, with the first interface 110 (e.g., an inner interface) being in contact with the coupling medium 109 and the second interface 111 (e.g., a touch interface) being in contact with the environment. The transmitter 105 is configured to transmit an ultrasonic transmit wave 112 toward the touch structure 102 (e.g., at the first interface 110 and the second interface 111). The first interface 110 and the second interface 111 are configured to reflect the ultrasonic transmit wave 112 back into the package cavity 103 to be received by the receiver 106 as ultrasonic reflected waves 113 and 114, respectively. The receiver 106 converts the ultrasonic reflected waves 113 and 114 into measurement signals for processing and analysis. Specifically, the first interface 110 reflects the ultrasonic transmit wave 112 by internal reflection to produce the ultrasonic reflected wave 113, and the second interface 111 reflects the ultrasonic transmit wave 112 by internal reflection to produce the ultrasonic reflected wave 114. Since the second interface 111 is more distant from the transmitter 105 than the first interface 110, the ultrasonic reflected wave 114 occurs at a later time instance than the occurrence of the ultrasonic reflected wave 113. In this way, both ultrasonic reflected waves 113 and 114 can be measured by a respective measurement signal and evaluated.

The receiver 106 may output a continuous measurement signal while the ultrasonic reflected waves 113 and 114 are received, and the sensor circuit 107 may obtain a first measurement signal from the continuous measurement signal in a first observation window corresponding to the ultrasonic reflected wave 113, and may obtain a second measurement signal from the continuous measurement signal in a second observation window corresponding to the ultrasonic reflected wave 114. Thus, the first measurement signal and the second measurement signal may be different portions of the continuous measurement signal output by the receiver 106. As described in greater detail below, a waveform of the ultrasonic reflected wave 114 may be particularly useful to the sensor circuit 107 for making a touch/no-touch decision because the ultrasonic reflected wave 114 is more sensitive to touches occurring at the second interface 111 (e.g., the touch interface).

Additionally, a timing difference between reception times of the ultrasonic reflected waves 113 and 114 can be evaluated. Accordingly, the transmitter 105 and the receiver 106 are coupled together by the coupling medium 109. The coupling medium 109 and the touch structure 102 form a propagation channel between the transmitter 105 and the receiver 106.

An acoustic impedance change at the second interface 111 from a touch applied to the touch surface 104 causes a change in the ultrasonic reflected wave 114. In particular, a change in a signal amplitude of the ultrasonic reflected wave 114 occurs when the touch surface 104 is touched by, for example, a finger of the user (e.g., a direct touch, with skin making direct contact with the touch surface 104). The change in the ultrasonic reflected wave 114 can be detected or used at a receiver side of the ultrasonic touch sensor 100 for detecting the touch event or the no-touch event, as well as for determining touch location and touch force. Specifically, the touch event at the touch surface 104 may cause a damping effect, where part of the energy of the ultrasonic transmit wave 112 is absorbed or dissipated by the finger. Accordingly, the signal amplitude of the ultrasonic reflected wave 114 during the touch event may be reduced relative to the signal amplitude of the ultrasonic reflected wave 114 during the no-touch event. The waveform of the ultrasonic reflected wave 114 during the no-touch event may be used by the sensor circuit 107 as a reference waveform for a touch/no-touch determination. For example, when the waveform of the ultrasonic reflected wave 114 remains similar to the reference waveform, the ultrasonic reflected wave 114 may correspond to a no-touch event. Alternatively, when a difference between the waveform of the ultrasonic reflected wave 114 and the reference waveform satisfies a threshold (e.g., the difference is greater than the threshold, the difference is greater than or equal to the threshold, or the difference satisfies another threshold condition), the ultrasonic reflected wave 114 may correspond to a touch event.

In some implementations, the signal amplitude of the ultrasonic reflected wave 114 during the no-touch event may be used by the sensor circuit 107 as a reference level for the touch/no-touch determination. The sensor circuit 107 may measure the signal amplitude of the ultrasonic reflected wave 114 and compare the signal amplitude and the reference level for the touch/no-touch determination. If a difference between the signal amplitude of the ultrasonic reflected wave 114 and the reference level satisfies a threshold (e.g., the difference is greater than the threshold, the difference is greater than or equal to the threshold, or the difference satisfies another threshold condition), the ultrasonic reflected wave 114 may correspond to a touch event. Therefore, a property of the ultrasonic reflected wave 114 may depend on the existence or the non-existence of the touch event. The property of the reflected ultrasonic sound wave can be measured at the sensor circuit 107 to discriminate between a presence of the touch event or the no-touch event.

Meanwhile, the acoustic impedance change resulting from the touch event may be minimal at the first interface 110. As a result, the acoustic impedance change may not cause a measurable change in a property of the ultrasonic reflected wave 113. In other words, the ultrasonic reflected wave 113 may not undergo a measurable change as a result of a change in the acoustic impedance at the touch surface 104. As a result, the ultrasonic reflected wave 114 may be used for detecting changes in the acoustic impedance at the touch surface 104 for discriminating between the touch event and the no-touch event.

In particular, the touch event at the touch surface 104 of the touch structure 102 causes a change in a property of the propagation channel (e.g., a property at the second interface 111) and thereby changes the propagation of the ultrasound waves through the propagation channel from the transmitter 105 to the receiver 106. In other words, a property of an ultrasound wave propagating along the propagation channel changes in response to a touch event at the touch surface 104 and the sensor circuit 107 is configured to detect the touch event, including one or more characteristics thereof, including an amount of contact pressure, a contact duration, and a contact location on the touch surface 104.

During operation of the ultrasonic touch sensor 100, the sensor circuit 107 is configured to apply a touch detection algorithm to distinguish between the touch event and the no-touch event. The touch detection algorithm may take into account or be insensitive to various disturbances, including electrical and ultrasonic cross-talk, multipath propagation, noise, temperature, and/or environmental disturbances (such as dirt or water) on the touch surface 104. The touch detection algorithm may take into account or be insensitive to various calibration factors, including different touch surfaces, variations in mounting, non-linear behaviors, large offsets, and drifting effects.

In some implementations, the sensor circuit 107 may be configured to generate a first plurality of digital samples from a first signal (e.g., a reference measurement signal) generated by and output from the receiver 106 during a no-touch event (e.g., a reference no-touch event) during an observation window that corresponds to the ultrasonic reflected wave 114 reflected by the second interface 111. The first plurality of digital samples may represent an envelope of the first signal. The sensor circuit 107 may store the first plurality of digital samples as a plurality of reference samples in memory. In other words, the first signal corresponds to the ultrasonic reflected wave 114 received during the no-touch event and is used as a reference signal to be used for making touch/no-touch decisions during a touch monitoring operation. After obtaining and storing the plurality of reference samples, the sensor circuit 107 may be configured to generate a second plurality of digital samples from a second signal (e.g., a monitored measurement signal) generated by and output from the receiver 106 during the touch monitoring operation (e.g., during an excitation frame used for a touch/no-touch decision). The second plurality of digital samples may represent an envelope of the second signal. The sensor circuit 107 may calculate a distance (e.g., a Euclidean distance) of the second plurality of digital samples to the first plurality of digital samples (e.g., to the plurality of reference samples), and determine whether a no-touch event or a touch event has occurred at the touch surface 104, based on the distance. For example, if the distance is less than a threshold, the sensor circuit 107 may detect that a no-touch event has occurred. Alternatively, if the distance is equal to or greater than the threshold, the sensor circuit 107 may detect that a touch event has occurred.

Accordingly, the sensor circuit 107 may be configured to receive a measurement signal from the receiver 106 corresponding to the ultrasonic reflected wave 114 during the touch monitoring operation, compare the measurement signal with the reference signal to generate a comparison result (e.g., whether the measurement signal satisfies a threshold, or a defined correlation between the measurement signal and the reference signal satisfies the threshold), and determine a touch/no-touch decision based on the comparison result.

Alternatively, in some implementations, the first signal (e.g., the reference measurement signal) may be generated by and output from the receiver 106 during a touch event (e.g., a reference touch event). As a result, the plurality of reference samples may correspond to the ultrasonic reflected wave 114 received during the touch event and be stored in memory, to be used by the sensor circuit 107 for making touch/no-touch decisions during the touch monitoring operation. Accordingly, in this case, if the distance calculated during the touch monitoring operation is less than a threshold, the sensor circuit 107 may detect that a touch event has occurred, and if the distance calculated during the touch monitoring operation is equal to or greater than the threshold, the sensor circuit 107 may detect that a no-touch event has occurred.

In some implementations, digital samples may be obtained from an ultrasonic reflected wave that is reflected by a different interface during the touch monitoring operation and compared with the reference signal in a similar manner as described above, including calculating a distance (e.g., a Euclidean distance) between the digital samples and reference samples of the reference signal and determining whether a no-touch event or a touch event has occurred at the touch surface based on whether or not the distance satisfies a threshold.

The touch detection algorithm may include a machine learning model that is trained to distinguish between a touch event and a no-touch event. Machine learning involves computers learning from data to perform tasks. Machine learning algorithms are used to train machine learning models based on sample data, known as "training data." Once trained, machine learning models may be used to make predictions, decisions, or classifications relating to new observations. The sensor circuit 107 may distinguish between a touch event and a no-touch event using a machine learning model. The machine learning model may include and/or may be associated with, for example, a neural network. In some implementations, the sensor circuit 107 uses the machine learning model to distinguish between a touch event and a no-touch event by providing candidate parameters as input to the machine learning model, and using the machine learning model to determine a likelihood, probability, or confidence that a particular outcome (e.g., that a no-touch is detected or that a touch is detected at the touch surface 104) for a subsequent touch detection operation will be determined using the candidate parameters. In some implementations, the sensor circuit 107 provides one or more measurements as input to the machine learning model, and the sensor circuit 107 uses the machine learning model to determine or identify a particular result that is most probable (for example, that a no-touch, a touch, a short touch, a long touch, a soft touch, a hard touch, a static touch, a dynamic touch (e.g., a moving touch), a direct touch (e.g., a touch made by direct skin contact with the touch surface 104), and/or an indirect touch (e.g., a touch made by non-skin contact with the touch surface 104) is present at the touch surface 104).

The sensor circuit 107 may train, update, and/or refine the machine learning model to increase the accuracies of the outcomes and/or parameters determined using the machine learning model. The sensor circuit 107 may train, update, and/or refine the machine learning model based on feedback and/or results from the subsequent touch detection operation, as well as from historical or related touch detection operations (e.g., from hundreds, thousands, or more historical or related touch detection operations) performed by the sensor circuit 107.

A touch event at the touch surface 104 of the touch structure 102 may also cause a change in a property of the receiver 106. For example, the touch force of the touch event may change a sensitivity of the receiver 106 due to an internal pressure acting on the flexible membrane of the receiver 106 caused by the touch force. The sensor circuit 107 may exploit this change in sensitivity to detect an external force applied to the touch surface 104, including the touch force of the touch event.

During operation of the ultrasonic touch sensor 100, the sensor circuit 107 may be configured to generate the ultrasonic transmit wave 112 for each touch/no-touch decision by applying an excitation signal. Upon receipt of each ultrasonic reflected wave, the sensor circuit 107 makes a touch/no-touch decision using the touch detection algorithm. A time between subsequent touch detections (i.e., between successive excitation signals) can be on the order of 25 microseconds (µs), for example. A period between triggering an excitation signal and a next excitation signal may be referred to as an excitation frame. The sensor circuit 107 is configured to analyze reflected ultrasound waves for each excitation frame to make a touch/no-touch decision on a frame-by-frame basis. Lower power consumption and higher frame rates (e.g., less time between excitation signals) may be enabled when the touch detection algorithm is lower in complexity, for example, because the sensor circuit 107 is able to make the touch/no-touch decision more quickly when the touch detection algorithm is less complex.

An excitation signal may be a short signal pulse or a pulse train comprised of multiple short pulses (e.g., having a duration of about 100 nanoseconds (ns) up to about 1 µs). An excitation signal can have any shape (e.g., rectangular, sinusoidal, Gaussian, or Gaussian derivative) or may be a chirp signal whose frequency continuously increases or decreases from a start frequency to a stop frequency, for example, by using linear frequency modulation. Thus, an excitation signal may have either a fixed (constant) frequency or a changing (modulated) frequency. In a pulse train, the pulses may have a same frequency or may have different frequencies, and/or the same pulse duration (i.e., bandwidth) or different pulse durations (i.e., bandwidths). A signal amplitude of the excitation signals is also configurable and may vary between excitation signals. Pulses of a pulse train may have a constant (fixed) amplitude or varied amplitudes. A number of pulses used in a pulse train is also configurable among excitation signals. A pulse frequency (i.e., a period between successive pulses of a pulse train) may also be configurable and may be different among excitation signals that have a pulse train. A pulse train comprising signal chirps may have fixed (constant) start and stop frequencies among signal chirps or may have variable start and/or stop frequencies among signal chirps. The signal chirps may have the same pulse duration or have different pulse durations.

On the receiver side, the sensor circuit 107 includes an analog signal processing chain and/or a digital signal processing chain, both of which may include one or more optional components. The analog signal processing chain may include a direct down-converter and a low-pass filter as optional components. The direct down-converter may include any form of direct down-conversion of the ultrasonic reflected waves 113 and 114. For example, squaring, absolute value, or rectification, among other examples, may be used for performing the direct down-conversion. Analog circuit blocks for such down-conversion processing may include a multiplier or a diode. A low-pass filter cut-off frequency may be tuned to the bandwidth of the transmitted ultrasonic signal and the bandwidth of the transmitter 105. For example, the low-pass filter cut-off frequency may be set to 1 MHz or 2 MHz.

In some implementations, the sensor circuit 107 may include an analog-to-digital converter (ADC) that is configured to generate multiple digital samples (e.g., measurement samples) from the ultrasonic reflected waves 113 and 114 for each ultrasonic transmit wave 112 and store the digital samples in memory for evaluation. Additionally, or alternatively, in some implementations, the sensor circuit 107 may include an ADC that is configured to generate multiple digital samples from a measurement signal obtained from measuring another property of the ultrasonic touch sensor 100 (e.g., internal pressure, bias voltage, or a cross-coupling effect) and store the digital samples in memory for evaluation.

A digital processor of the sensor circuit 107 may be operable to evaluate digital samples received in an observation window using the touch detection algorithm to determine whether there is a no-touch event or a touch event corresponding to the ultrasonic transmit wave 112. The digital processor may use different observation windows for evaluating the ultrasonic reflected waves 113 and 114, which is possible due to a timing difference between when the ultrasonic reflected wave 113 is reflected by the first interface 110 and when the ultrasonic reflected wave 114 is reflected by the second interface 111. That is, the sensor circuit 107 can anticipate when the ultrasonic reflected waves 113 and 114 will be received based on a principle of time-of-flight. For example, a time-of-flight of a first reflection (e.g., the ultrasonic reflected wave 113) is a time required for the ultrasonic transmit wave 112 to travel from the transmitter 105, to the first interface 110, and back to the receiver 106. Likewise, a time-of-flight of a second reflection (e.g., the ultrasonic reflected wave 114) is a time required for the ultrasonic transmit wave 112 to travel from the transmitter 105, to the second interface 111, and back to the receiver 106. In both instances, an approximate distance traveled and the speed of travel of the ultrasonic signal are known parameters. Thus, each observation window has a predetermined start time and a predetermined end time for evaluating a respective one of the ultrasonic reflected waves 113 and 114.

The ultrasonic touch sensor 100 may further include a light source 115 (e.g., an activating light source), such as a light emitting diode (LED), arranged in the package cavity 103. The light source 115 may produce an activating light. For example, the light source 115 may be an ultraviolet (UV) light source or a blue light source, and the activating light may be an ultraviolet light or a blue light, respectively.

The coupling medium 109 may include a luminescent material that is configured to be activated (e.g., stimulated) by the activating light to produce a backlight that is emitted from the package cavity. The backlight may be a visible light having an emission wavelength in a visible light spectrum that corresponds to the luminescent material. For example, the backlight may consist of one color or hue, such as red, green, or blue. The luminescent material may include a photoluminescent material or chemiluminescent material. The photoluminescent material may include a fluorescent material, a phosphorescent material, or quantum dots. The luminescent material may include luminescent particles that are suspended in one or more regions of the coupling medium 109 or suspended throughout the coupling medium. Thus, the coupling medium 109 may be implemented as a homogeneous light source that provides a low-cost solution for providing backlight.

The coupling medium 109 may be an elastic gel that encapsulates the transmitter 105, the receiver 106, the sensor circuit 107, and the light source 115 in the package cavity 103. Moreover, the coupling medium 109 may be coupled to the transmitter 105 and the receiver 106 such that the transmitter 105 and the receiver 106 are mechanically coupled and acoustically coupled via the coupling medium 109. Thus, the coupling medium 109 may provide coupling and backlight generation.

The touch structure 102 may be optically transparent or may include an optically transparent region that is transparent to the backlight such that the backlight is emitted from the ultrasonic touch sensor 100 through the touch structure 102.

As indicated above, FIG. 1 is provided as an example. Other examples may differ from what is described with regard to FIG. 1. For example, in some implementations, an array of transmitters, receivers, or transceivers may be provided within the package cavity 103 of the ultrasonic touch sensor 100. In some implementations, the touch structure 102 may include multiple layers, resulting in more than two ultrasound reflections or echoes. In some implementations, additional circuit components may be added without deviating from the disclosure provided above.

Figure 2:
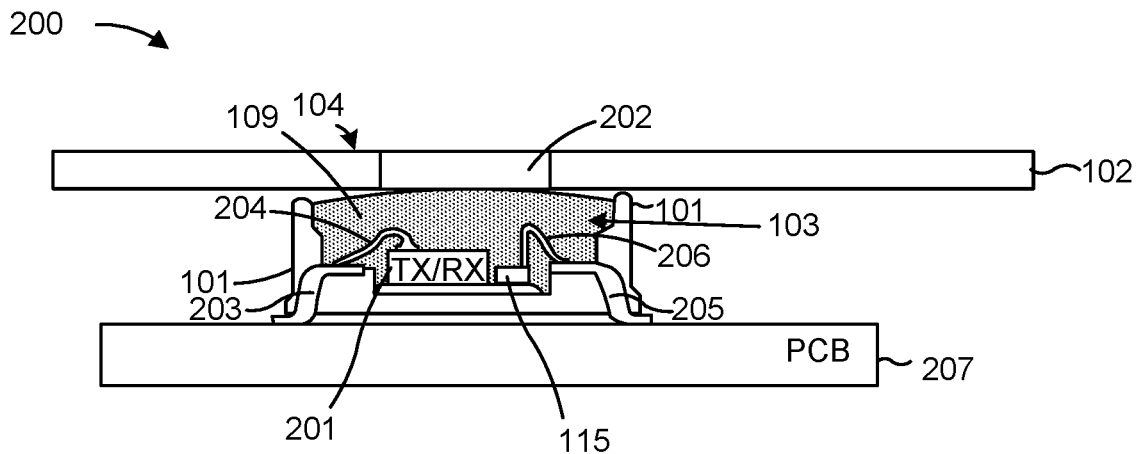
FIG. 2 illustrates an ultrasonic touch sensor according to one or more implementations.

FIG. 2 illustrates an ultrasonic touch sensor 200 according to one or more implementations. The ultrasonic touch sensor 200 is similar to the ultrasonic touch sensor 100 described in connection with FIG. 1, except the transmitter 105 and the receiver 106 are combined into a single touch sensor chip 201. In some implementations, the touch sensor chip 201 may also include the sensor circuit 107. Thus, the touch sensor chip 201 includes a transceiver transducer (TX/RX) that may be configured into a transmitting mode for transmitting ultrasonic transmit waves and into a receiving mode for receiving ultrasonic reflected waves.

The frame 101 may be a package molding that is molded to form the package cavity 103. Thus, the package cavity 103 may be a recess formed in the package molding.

In addition, the touch structure 102 may have an optically transparent region 202 (e.g., transparent window) that is transparent to the backlight produced by the coupling medium 109 when activated by activating light from the light source 115. In addition, the optically transparent region 202 may represent a sensitive area of the touch structure 102 at which the ultrasonic touch sensor 200 is sensitive to touches. Thus, the touch structure 102 may be coupled to the housing (e.g., the frame 101) and the coupling medium 109. The touch structure 102 is arranged over the package cavity 103 and includes the touch surface 104 for receiving touches.

The touch sensor chip 201 may be electrically coupled to a first electrical interconnect 203 (e.g., a first lead) by a first bond wire 204. The light source 115 may be electrically coupled to a second electrical interconnect 205 (e.g., a second lead) by a second bond wire 206. The first electrical interconnect 203 and the second electrical interconnect 205 of the ultrasonic touch sensor 200 may be electrically coupled to a carrier substrate 207, such as a PCB.

As indicated above, FIG. 2 is provided as an example. Other examples may differ from what is described with regard to FIG. 2.

Figure 3:
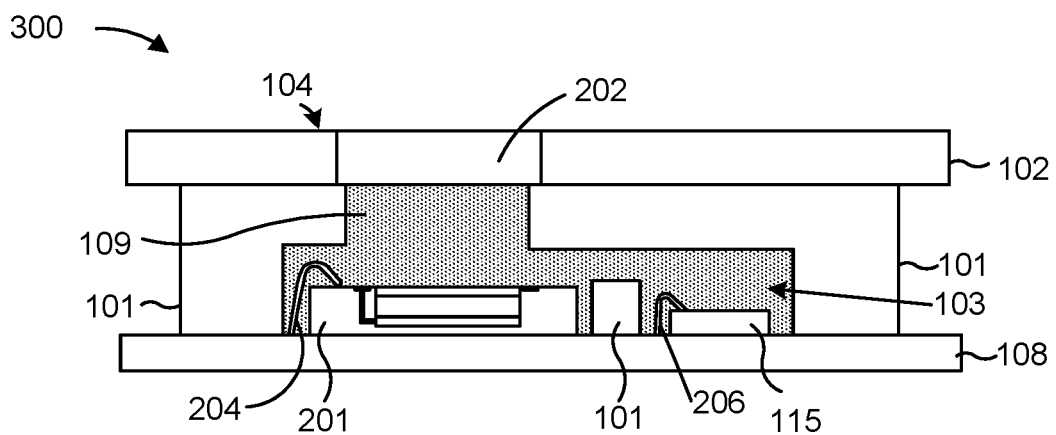
FIG. 3 illustrates an ultrasonic touch sensor according to one or more implementations.

FIG. 3 illustrates an ultrasonic touch sensor 300 according to one or more implementations. The ultrasonic touch sensor 300 is similar to the ultrasonic touch sensor 200 described in connection with FIG. 2. In this example, the frame 101 is a package molding and the package cavity 103 is a cavity defined by the package molding. The touch structure 102 may be coupled to the frame 101 and the coupling medium 109. In addition, the touch structure 102 is arranged over the package cavity 103 and includes the touch surface 104 for receiving touches.

The circuit substrate 108 may form a base of the housing on which the package molding is formed.

As indicated above, FIG. 3 is provided as an example. Other examples may differ from what is described with regard to FIG. 3.

Figure 4:
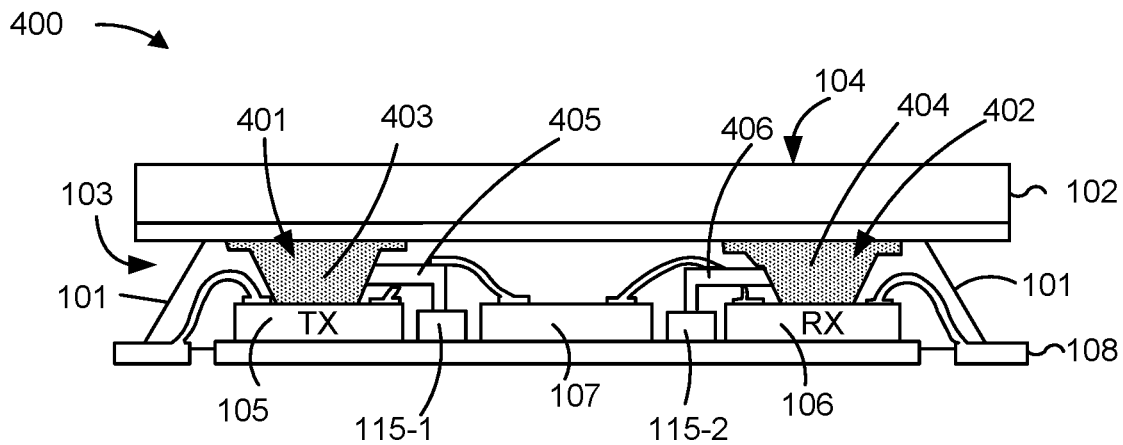
FIG. 4 illustrates an ultrasonic touch sensor according to one or more implementations.

FIG. 4 illustrates an ultrasonic touch sensor 400 according to one or more implementations. The ultrasonic touch sensor 400 includes the package cavity 103 that includes a first recess 401 and a second recess 402. The frame 101 may be a package molding that defines the first recess 401 and the second recess 402. The transmitter 105 may be arranged at the first recess 401, and the receiver 106 may be arranged at the second recess 402. Additionally, the ultrasonic touch sensor 400 includes a first coupling medium 403 that fills or at least partially fills the first recess 401 and a second coupling medium 404 that fills or at least partially fills the second recess 402. For example, the first coupling medium 403 may couple the transmitter 105 to the touch structure 102, and the second coupling medium 404 may couple the receiver 106 to the touch structure 102. The first coupling medium 403 may include a first luminescent material that is configured to emit a first backlight. The second coupling medium 404 may include a second luminescent material that is configured to emit a second backlight.

The ultrasonic touch sensor 400 may further include a first light source 115-1 (e.g., a first activating light source) that is configured to produce a first activating light having a first wavelength, and a second light source 115-2 (e.g., a second activating light source) that is configured to produce a second activating light having a second wavelength that may be the same as the first wavelength or may be a different wavelength from the first wavelength. The first light source 115-1 may be optically coupled with the first coupling medium 403 such that the first activating light is able to activate the first luminescent material for producing the first backlight to be emitted from the package cavity 103. For example, a first light path provided by a first waveguide 405 may guide the first activating light to the first recess 401. Alternatively, the first light source 115-1 may be arranged outside of the package molding. The second light source 115-2 may be optically coupled with the second coupling medium 404 such that the second activating light is able to activate the second luminescent material for producing the second backlight to be emitted from the package cavity 103. For example, a second light path provided by a second waveguide 406 may guide the second activating light to the second recess 402. Alternatively, the second light source 115-2 may be arranged outside of the package molding.

As indicated above, FIG. 4 is provided as an example. Other examples may differ from what is described with regard to FIG. 4.

Figure 5:
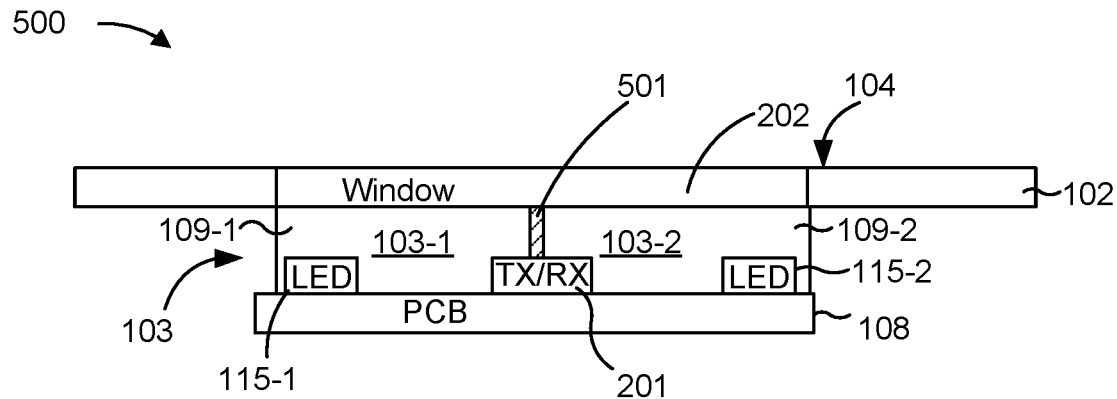
FIG. 5 illustrates a cross-section of an ultrasonic touch sensor according to one or more implementations.

FIG. 5 illustrates a cross-section of an ultrasonic touch sensor 500 according to one or more implementations. The ultrasonic touch sensor 500 includes the touch sensor chip 201 arranged on the circuit substrate 108 (e.g., a PCB) and arranged in the package cavity 103. The touch structure 102, having the optically transparent region 202, is arranged over the package cavity 103 and is coupled to a first coupling medium 109-1 and a second coupling medium 109-2.

A wavelength filter 501 separates the package cavity into a first region 103-1 (e.g., a first light emitting region) and a second region 103-2 (e.g., a second light emitting region). The first coupling medium 109-1 may at least partially fill the first region 103-1 of the package cavity 103. The second coupling medium 109-2 may at least partially fill the second region 103-2 of the package cavity 103. The first coupling medium 109-1 may include a first luminescent material that is configured to emit a first backlight at a first wavelength corresponding to a first color. The second coupling medium 109-2 may include a second luminescent material that is configured to emit a second backlight at a second wavelength corresponding to a second color, which may be different from the first color. For example, the first color may one of red, green, or blue, and the second color may be a different one of red, green, or blue. The first luminescent material may be configured to be activated by a first activating light to produce the first backlight that is to be emitted from the package cavity 103 (e.g., through the optically transparent region 202). The second luminescent material may be configured to be activated by a second activating light to produce the second backlight that is to be emitted from the package cavity 103 (e.g., through the optically transparent region 202).

The ultrasonic touch sensor 500 further includes a first light source 115-1 arranged in the first region 103-1 and a second light source 115-2 arranged in the second region 103-2. The first coupling medium 109-1 may encapsulate the first light source 115-1 and a first part of the touch sensor chip 201. The second coupling medium 109-2 may encapsulate the second light source 115-2 and a second part of the touch sensor chip 201.

The first light source 115-1 and the second light source 115-2 may be electrically coupled to the circuit substrate 108 for receiving power signals. The first light source 115-1 may produce the first activating light (e.g., a first UV light) that is configured to activate the first luminescent material for producing the first backlight. The second light source 115-2 may produce the second activating light (e.g., a second UV light) that is configured to activate the second luminescent material for producing the second backlight. The first light source 115-1 and the second light source 115-2 may be independently driven such that the first and the second backlights can be independently generated. In some cases, only one of the first and the second backlights may be activated. In other cases, both the first and the second backlights may be activated simultaneously.

The wavelength filter 501 may be intransparent to the first activating light and the second activating light such that the wavelength filter 501 blocks the first activating light from entering the second region 103-2 of the package cavity 103 and blocks the second activating light from entering the first region 103-1 of the package cavity 103. As a result, the first and the second backlights may be activated independently by the first light source 115-1 and the second light source 115-2, respectively. In addition, the wavelength filter 501 may be transparent to visible light (e.g., to the first backlight and the second backlight). Thus, the first backlight may pass through the wavelength filter 501 to enter the second region 103-2, and the second backlight may pass through the wavelength filter 501 to enter the first region 103-1.

In some implementations, the wavelength filter 501 may extend from a top-side of the touch sensor chip 201 to the touch structure 102 (e.g., to the first interface 110 of the touch structure 102).

In some implementations, the wavelength filter 501 may not be present. Instead, the first luminescent material may be sensitive only to wavelengths of the first activating light and the second luminescent material may be sensitive only to wavelengths of the second activating light. Thus, the first light source 115-1 and the second light source 115-2 may emit different wavelengths for independently activating (e.g., stimulating) the first luminescent material and the second luminescent material, respectively.

As indicated above, FIG. 5 is provided as an example. Other examples may differ from what is described with regard to FIG. 5.

Figure 6:
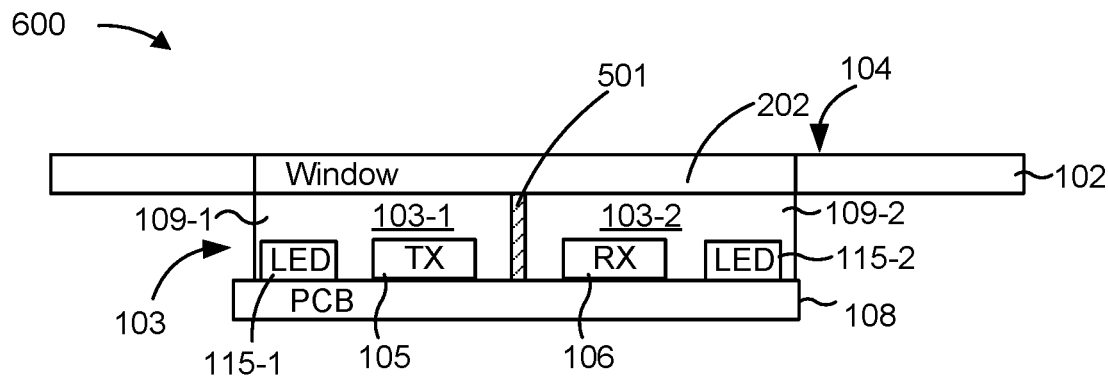
FIG. 6 illustrates a cross-section of an ultrasonic touch sensor according to one or more implementations.

FIG. 6 illustrates a cross-section of an ultrasonic touch sensor 600 according to one or more implementations. The ultrasonic touch sensor 600 is similar to the ultrasonic touch sensor 500 described in connection with FIG. 5, with the exception that the transmitter and the receiver are separated. Thus, the ultrasonic touch sensor 500 includes the transmitter 105 arranged in the first region 103-1 and the receiver 106 arranged in the second region 103-2. Thus, the wavelength filter 501 may extend from a top-side of the circuit substrate 108 to the touch structure 102 (e.g., to the first interface 110 of the touch structure 102).

As indicated above, FIG. 6 is provided as an example. Other examples may differ from what is described with regard to FIG. 6.

Figure 7A:
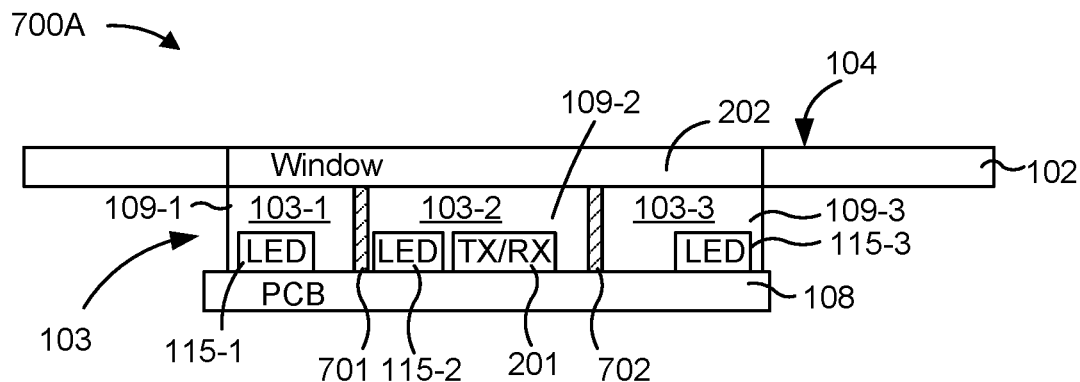
FIG. 7A illustrates a cross-section of an ultrasonic touch sensor according to one or more implementations.

FIG. 7A illustrates a cross-section of an ultrasonic touch sensor 700A according to one or more implementations. The ultrasonic touch sensor 700A includes the touch sensor chip 201 arranged on the circuit substrate 108 (e.g., a PCB) and arranged in the package cavity 103. The touch structure 102, having the optically transparent region 202, is arranged over the package cavity 103 and is coupled to a first coupling medium 109-1, a second coupling medium 109-2, and a third coupling medium 109-3.

A plurality of wavelength filters that may be intransparent to a wavelength range (e.g., a wavelength range corresponding to UV light) may be provided to separate the package cavity 103 into a plurality of regions, including a first region 103-1, a second region 103-2, and a third region 103-3 (e.g., a third light emitting region). For example, the ultrasonic touch sensor 700A may include a first wavelength filter 701 that separates the first region 103-1 and the second region 103-2, and a second wavelength filter 702 that separates the second region 103-2 and the third region 103-3. The first wavelength filter 701 and the second wavelength filter 702 may extend between the circuit substrate 108 and the touch structure 102 to form vertical barriers.

The first coupling medium 109-1 may at least partially fill the first region 103-1 of the package cavity 103, the second coupling medium 109-2 may at least partially fill the second region 103-2 of the package cavity 103, and the third coupling medium 109-3 may at least partially fill the third region 103-3 of the package cavity 103. The first coupling medium 109-1 may include a first luminescent material that is configured to emit a first backlight at a first wavelength corresponding to a first color. The second coupling medium 109-2 may include a second luminescent material that is configured to emit a second backlight at a second wavelength corresponding to a second color, which may be different from the first color. The third coupling medium 109-3 may include a third luminescent material that is configured to emit a third backlight at a third wavelength corresponding to a third color, which may be different from the first color and the second color. For example, the first color may be green, the second color may blue, and the third color may be red. The first luminescent material may be configured to be activated by a first activating light to produce the first backlight that is to be emitted from the package cavity 103 (e.g., through the optically transparent region 202). The second luminescent material may be configured to be activated by a second activating light to produce the second backlight that is to be emitted from the package cavity 103 (e.g., through the optically transparent region 202). The third luminescent material may be configured to be activated by a third activating light to produce the third backlight that is to be emitted from the package cavity 103 (e.g., through the optically transparent region 202).

The ultrasonic touch sensor 700A further includes a first light source 115-1 arranged in the first region 103-1, a second light source 115-2 arranged in the second region 103-2, and a third light source 115-3 (e.g., a third activating light source). The first coupling medium 109-1 may encapsulate the first light source 115-1. The second coupling medium 109-2 may encapsulate the second light source 115-2 and the touch sensor chip 201. The third coupling medium 109-3 may encapsulate the third light source 115-3.

The first light source 115-1, the second light source 115-2, and the third light source 115-3 may be electrically coupled to the circuit substrate 108 for receiving power signals. The first light source 115-1 may produce the first activating light (e.g., a first UV light) that is configured to activate the first luminescent material for producing the first backlight. The second light source 115-2 may produce the second activating light (e.g., a second UV light) that is configured to activate the second luminescent material for producing the second backlight. The third light source 115-3 may produce the third activating light (e.g., a third UV light) that is configured to activate the third luminescent material for producing the third backlight. The first light source 115-1, the second light source 115-2, and the third light source 115-3 may be independently driven such that the first, the second, and the third backlights can be independently generated. In some cases, one, two, or all three of the first, the second, and the third backlights may be activated at a time.

The first wavelength filter 701 may be intransparent to the first activating light and the second activating light such that the first wavelength filter 701 blocks the first activating light from entering the second region 103-2 of the package cavity 103 and blocks the second activating light from entering the first region 103-1 of the package cavity 103. As a result, the first and the second backlights may be activated independently by the first light source 115-1 and the second light source 115-2, respectively. In addition, the first wavelength filter 701 may be transparent to visible light (e.g., to the first backlight, the second backlight, and the third backlight). Thus, the first backlight may pass through the first wavelength filter 701 to enter the second region 103-2, and the second backlight may pass through the first wavelength filter 701 to enter the first region 103-1.

Additionally, the second wavelength filter 702 may be intransparent to the second activating light and the third activating light such that the second wavelength filter 702 blocks the second activating light from entering the third region 103-3 of the package cavity 103 and blocks the third activating light from entering the second region 103-2 of the package cavity 103. As a result, the second and the third backlights may be activated independently by the second light source 115-2 and the third light source 115-3, respectively. In addition, the second wavelength filter 702 may be transparent to visible light (e.g., to the first backlight, the second backlight, and the third backlight). Thus, the second backlight may pass through the second wavelength filter 702 to enter the third region 103-3, and the third backlight may pass through the second wavelength filter 702 to enter the second region 103-2.

In some implementations, one or both wavelength filters 701 and 702 may not be present. Instead, the first luminescent material may be sensitive only to wavelengths of the first activating light, the second luminescent material may be sensitive only to wavelengths of the second activating light, and/or the third luminescent material may be sensitive only to wavelengths of the third activating light. Thus, the first light source 115-1, the second light source 115-2, and/or the third light source 115-3 may emit different wavelengths for independently activating (e.g., stimulating) the first luminescent material, the second luminescent material, and the third luminescent material, respectively.

In some implementations, the transmitter and the receiver of the touch sensor chip 201 may be implemented in separate ultrasonic transducers. For example, the transmitter 105 and the receiver 106, as similarly shown in FIG. 6, may be provided.

As indicated above, FIG. 7A is provided as an example. Other examples may differ from what is described with regard to FIG. 7A.

Figure 7B:
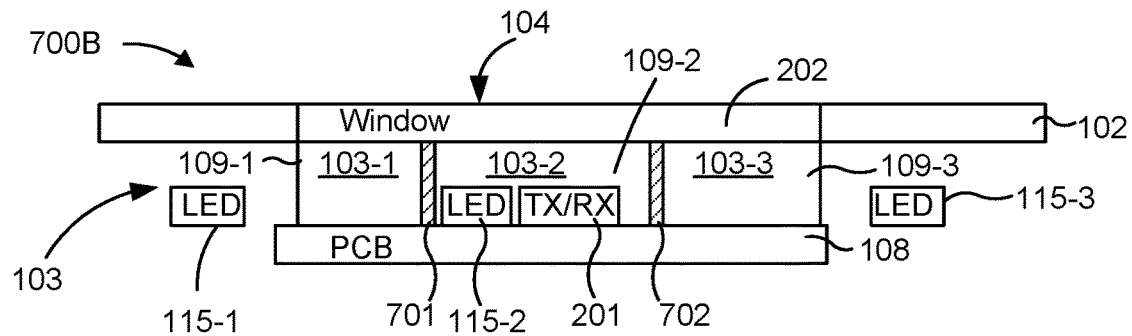
FIG. 7B illustrates a cross-section of an ultrasonic touch sensor according to one or more implementations.

FIG. 7B illustrates a cross-section of an ultrasonic touch sensor 700B according to one or more implementations. The ultrasonic touch sensor 700B is similar to the ultrasonic touch sensor 700A described in connection with FIG. 7A, with the exception that the first light source 115-1 and the third light source 115-3 are located outside the first coupling medium 109-1 and the third coupling medium 109-3, respectively. Thus, one or more light sources may be located inside or outside a respective coupling medium, as long as the light source is capable of simulating a luminescent material of the respective coupling medium for producing a respective backlight. The first light source 115-1 and the third light source 115-3 may be electrically coupled to the circuit substrate 108 or may be electrically coupled to one or more different circuit substrates for receiving power signals.

As indicated above, FIG. 7B is provided as an example. Other examples may differ from what is described with regard to FIG. 7B.

Figure 7C:
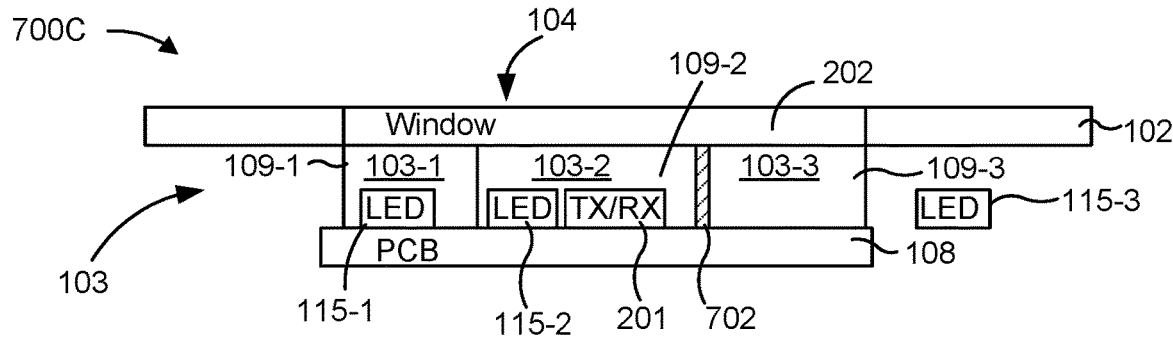
FIG. 7C illustrates a cross-section of an ultrasonic touch sensor according to one or more implementations.

FIG. 7C illustrates a cross-section of an ultrasonic touch sensor 700C according to one or more implementations. The ultrasonic touch sensor 700C is similar to the ultrasonic touch sensor 700A described in connection with FIG. 7A, with the exception that the first wavelength filter 701 is not present in the ultrasonic touch sensor 700C. Instead, the first light source 115-1 and the second light source 115-2 may emit light at different wavelengths that are used for stimulating different luminescent materials. For example, the first light source 115-1 may emit the first activating light at a first wavelength and the second light source 115-2 may emit the second activating light at a second wavelength that is in a different wavelength region than the first wavelength. The first luminescent material of the first coupling material 109-1 may be configured to be stimulated by the first wavelength and may be configured to not be stimulated by the second wavelength. In other words, the first luminescent material may be insensitive to the second wavelength. The second luminescent material of the second coupling material 109-2 may be configured to be stimulated by the second wavelength and may be configured to not be stimulated by the first wavelength. In other words, the second luminescent material may be insensitive to the first wavelength. Thus, the first coupling material 109-1 and the second coupling material 109-2 may be in direct contact with each other. Alternatively, instead of a wavelength filter, a transparent substrate that is both transparent to UV light and visible light may be used to separate the first region 103-1 and the second region 103-2.

As indicated above, FIG. 7C is provided as an example. Other examples may differ from what is described with regard to FIG. 7C.

Figure 7D:
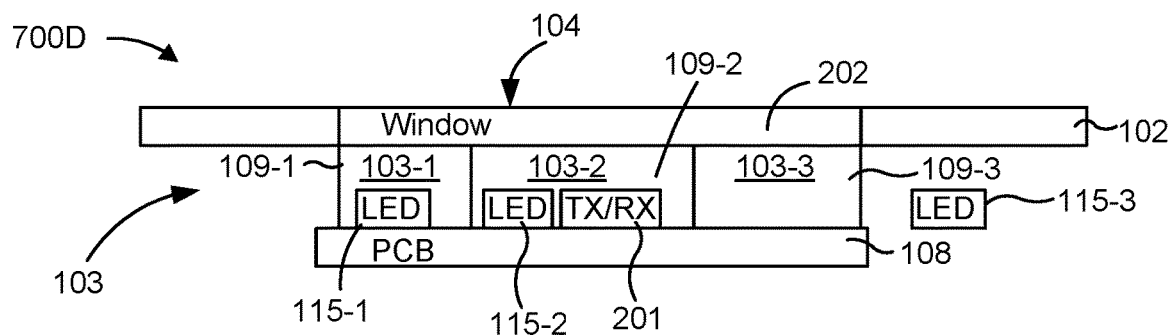
FIG. 7D illustrates a cross-section of an ultrasonic touch sensor according to one or more implementations.

FIG. 7D illustrates a cross-section of an ultrasonic touch sensor 700D according to one or more implementations. The ultrasonic touch sensor 700D is similar to the ultrasonic touch sensor 700A described in connection with FIG. 7A, with the exception that the first wavelength filter 701 and the second wavelength filter 702 are not present in the ultrasonic touch sensor 700D.

Instead, the first light source 115-1, the second light source 115-2, and the third light source 115-3 may emit light at different wavelengths that are used for stimulating different luminescent materials. For example, the first light source 115-1 may emit the first activating light at a first wavelength, the second light source 115-2 may emit the second activating light at a second wavelength, and the third light source 115-3 may emit the third activating light at a third wavelength, with the first wavelength, the second wavelength, and the third wavelength being different wavelengths in different wavelength regions. The first luminescent material of the first coupling material 109-1 may be configured to be stimulated by the first wavelength and may be configured to not be stimulated by the second wavelength or the third wavelength. In other words, the first luminescent material may be insensitive to the second and the third wavelengths. The second luminescent material of the second coupling material 109-2 may be configured to be stimulated by the second wavelength and may be configured to not be stimulated by the first wavelength or the third wavelength. In other words, the second luminescent material may be insensitive to the first wavelength and the third wavelength. The third luminescent material of the third coupling material 109-3 may be configured to be stimulated by the third wavelength and may be configured to not be stimulated by the first wavelength or the second wavelength. In other words, the third luminescent material may be insensitive to the first wavelength and the second wavelength. Thus, the first coupling material 109-1 and the second coupling material 109-2 may be in direct contact with each other. Additionally, the second coupling material 109-2 and the third coupling material 109-2 may be in direct contact with each other. Alternatively, instead of a wavelength filter, a first transparent substrate that is both transparent to UV light and visible light may be used to separate the first region 103-1 and the second region 103-2, and a second transparent substrate that is both transparent to UV light and visible light may be used to separate the second region 103-2 and the third region 103-3.

As indicated above, FIG. 7D is provided as an example. Other examples may differ from what is described with regard to FIG. 7D.

Figure 8:
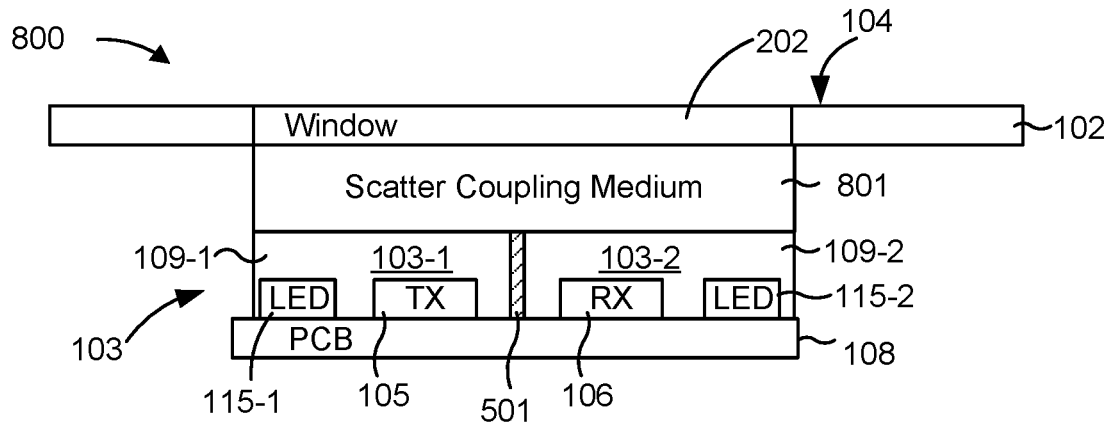
FIG. 8 illustrates a cross-section of an ultrasonic touch sensor according to one or more implementations.

FIG. 8 illustrates a cross-section of an ultrasonic touch sensor 800 according to one or more implementations. The ultrasonic touch sensor 800 is similar to the ultrasonic touch sensor 600 described in connection with FIG. 6, with the exception that the ultrasonic touch sensor 800 includes a scatter coupling medium 801. The scatter coupling medium 801 may be arranged in the package cavity 103 on the first coupling medium 109-1 and the second coupling medium 109-2. Additionally, the scatter coupling medium 801 may be coupled to the touch structure 102. Thus, the scatter coupling medium 801 may be arranged between the first coupling medium 109-1 and the touch structure 102, and between the second coupling medium 109-2 and the touch structure 102. The scatter coupling medium 801 may be configured to mechanically and acoustically couple the transmitter 105 and the receiver 106 to the touch structure 102. For example, the scatter coupling medium 801 may be an elastic gel. In some implementations, the scatter coupling medium 801 may be made of a same material or similar material as a material used for the first coupling medium 109-1 and the second coupling medium 109-2, with the exception that the scatter coupling medium 801 may include a scattering material (e.g., scattering particles) instead of a luminescent material. The scatter coupling medium 801 may be transparent to visible light, but may not be luminescent. Thus, the scattering material of the scatter coupling medium 801 may be configured to scatter or otherwise spread visible light throughout the scatter coupling medium 801.

In some implementations, the scattering material may scatter the visible light more strongly than activating light in order not to stimulate an unintended luminescent material. In some implementations, the wavelength filter 501 may extend from the top-side of the circuit substrate 108, through the scatter coupling medium 801, to the touch structure 102 (e.g., to the first interface 110 of the touch structure 102). Thus, the wavelength filter 501 may prevent the first activating light from stimulating the second luminescent material of the second coupling medium 109-2, and may prevent the second activating light from stimulating the first luminescent material of the first coupling medium 109-1, while allowing visible light to spread throughout the scatter coupling medium 801.

The scatter coupling medium 801 may receive the first backlight from the first coupling medium 109-1, and spread the first backlight across the package cavity 103 to uniformly emit the first backlight from the package cavity 103. As a result, the first backlight may uniformly exit the package cavity 103 through the optically transparent region 202 of the touch structure 102 as a first uniform backlight. Thus, dark spots at the optically transparent region 202 can be reduced or avoided. Additionally, the scatter coupling medium 801 may receive the second backlight from the second coupling medium 109-2, and spread the second backlight across the package cavity 103 to uniformly emit the second backlight from the package cavity 103. As a result, the second backlight may uniformly exit the package cavity 103 through the optically transparent region 202 of the touch structure 102 as a second uniform backlight. Thus, dark spots at the optically transparent region 202 can be reduced or avoided. Thus, visible light may be emitted from the package cavity 103 with a same, uniform light intensity across an entire portion of the optically transparent region 202. The scatter coupling medium 801 may be implemented in a similar manner in any of the implementations described herein.

As indicated above, FIG. 8 is provided as an example. Other examples may differ from what is described with regard to FIG. 8.

Figure 9:
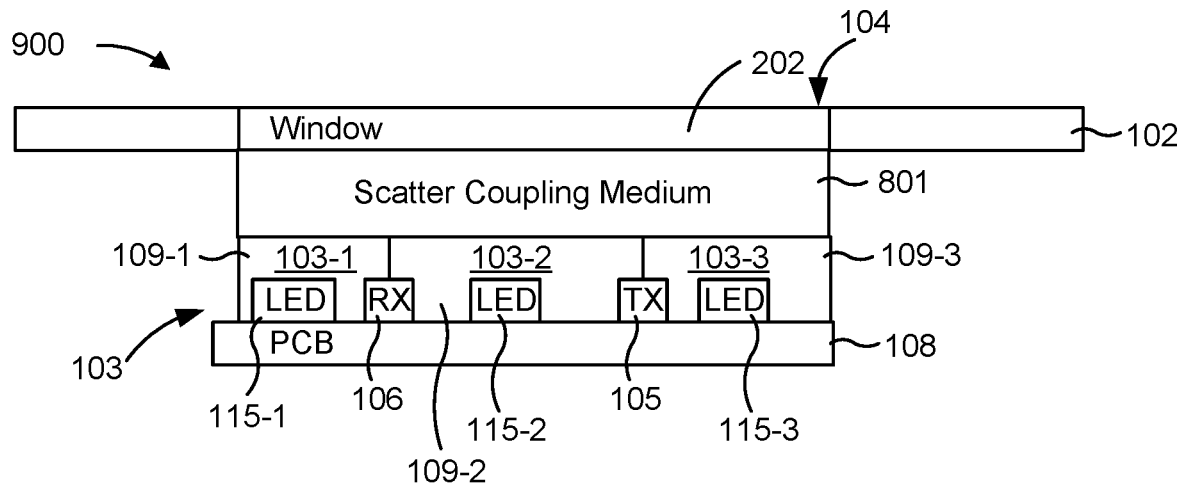
FIG. 9 illustrates a cross-section of an ultrasonic touch sensor according to one or more implementations.

FIG. 9 illustrates a cross-section of an ultrasonic touch sensor 900 according to one or more implementations. The ultrasonic touch sensor 900 is similar to the ultrasonic touch sensor 700D described in connection with FIG. 7D. However, the ultrasonic touch sensor 900 includes the scatter coupling medium 801 arranged on the first coupling medium 109-1, the second coupling medium 109-2, and the third coupling medium 109-3.

Thus, scatter coupling medium 801 may receive the first backlight from the first coupling medium 109-1, and spread the first backlight across the package cavity 103 to uniformly emit the first backlight from the package cavity 103. Additionally, the scatter coupling medium 801 may receive the second backlight from the second coupling medium 109-2, and spread the second backlight across the package cavity 103 to uniformly emit the second backlight from the package cavity 103. Additionally, the scatter coupling medium 801 may receive the third backlight from the third coupling medium 109-3, and spread the third backlight across the package cavity 103 to uniformly emit the third backlight from the package cavity 103.

The transmitter 105 and the receiver 106 may be arranged in the package cavity 103 according to various configurations, with one configuration being shown in FIG. 9 as an example.

As indicated above, FIG. 9 is provided as an example. Other examples may differ from what is described with regard to FIG. 9.

Figure 10:
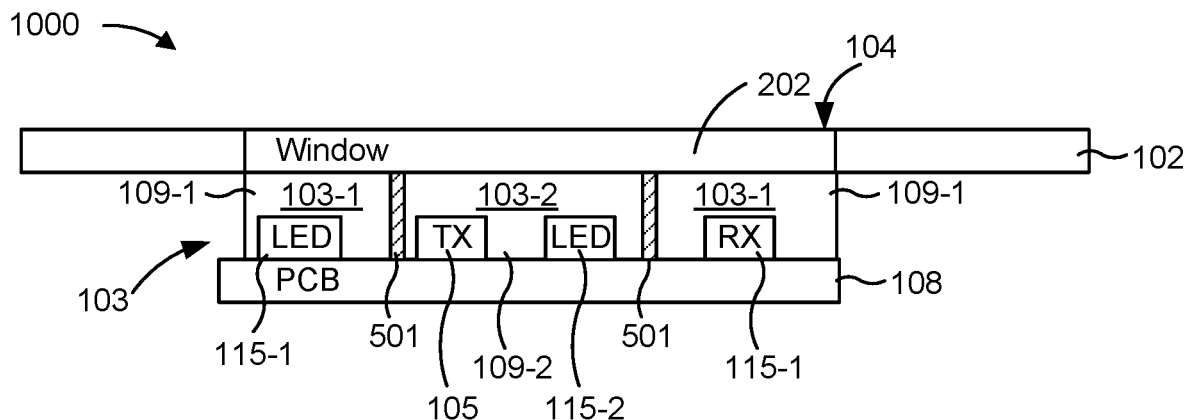
FIG. 10 illustrates a cross-section of an ultrasonic touch sensor according to one or more implementations.

FIG. 10 illustrates a cross-section of an ultrasonic touch sensor 1000 according to one or more implementations. The first region 103-1 of the package cavity 103 may surround or encircle the second region 103-2 of the package cavity 103. Thus, different light emission patterns (e.g., color patterns and shapes) may be implemented according to a pattern of the first coupling medium 109-1 and the second coupling medium 109-2.

In some implementations, the wavelength filter 501 may also surround the second region 103-2 in order to separate the first region 103-1 and the second region 103-2. As a result, the first light source 115-1 and the second light source 115-2 may produce the first activating light and the second activating light, respectively, at a same wavelength to selectively activate a respective luminescent material.

In some implementations, the wavelength filter 501 may not be provided. As a result, the first light source 115-1 and the second light source 115-2 may produce the first activating light and the second activating light, respectively, at different wavelengths to selectively activate a respective luminescent material.

The transmitter 105 and the receiver 106 may be arranged in the package cavity 103 according to various configurations, with one configuration being shown in FIG. 10 as an example.

As indicated above, FIG. 10 is provided as an example. Other examples may differ from what is described with regard to FIG. 10.

Figure 11A:
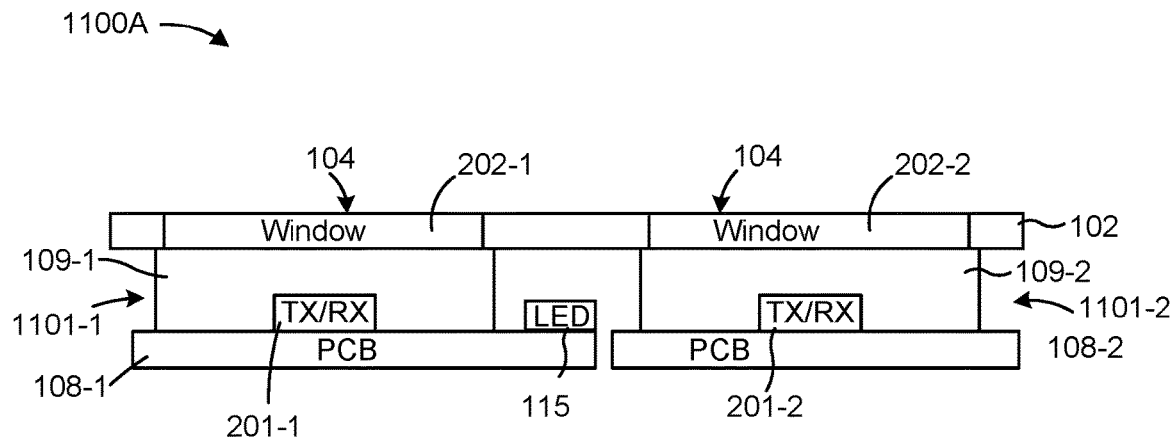
FIG. 11A illustrates a cross-section of an ultrasonic touch system according to one or more implementations.

FIG. 11A illustrates a cross-section of an ultrasonic touch system 1100A according to one or more implementations. The ultrasonic touch system 1100A may be a system of two or more ultrasonic touch sensors. The ultrasonic touch system 1100A may include the touch structure 102, implemented as part of a housing, that is shared by the two or more ultrasonic touch sensors. In addition, the touch structure 102 may include a respective optically transparent region for each ultrasonic touch sensor. For example, the touch structure 102 may include a first optically transparent region 202-1 and a second optically transparent region 202-2.

The ultrasonic touch system 1100A may include a first circuit substrate 108-1 and a second circuit substrate 108-2. An area between the first circuit substrate 108-1 and the touch structure 102 may define a first package cavity 1101-1. An area between the second circuit substrate 108-2 and the touch structure 102 may define a second package cavity 1101-2. Thus, the touch structure 102 may be arranged over the first package cavity 1101-1 and the second package cavity 1101-2 and includes the touch surface 104 for receiving touches.

The ultrasonic touch system 1100A may include a first touch sensor chip 201-1 arranged within the first package cavity 1101-1, and a second touch sensor chip 201-2 arranged within the second package cavity 1101-2. The first touch sensor chip 201-1 may include a first transceiver transducer (TX/RX) that may be configured into a transmitting mode for transmitting ultrasonic transmit waves and into a receiving mode for receiving ultrasonic reflected waves. The second touch sensor chip 201-2 may include a second TX/RX that may be configured into a transmitting mode for transmitting ultrasonic transmit waves and into a receiving mode for receiving ultrasonic reflected waves. Alternatively, the ultrasonic touch system 1100A may include separate transmitter/receiver pairs. For example, the ultrasonic touch system 1100A may include a first transmitter and a first receiver arranged in the first package cavity 1101-1 as separate ultrasonic transducers, and may include a second transmitter and a second receiver arranged in the second package cavity 1101-2 as separate ultrasonic transducers. In either case, the ultrasonic touch system 1100A includes a first ultrasonic transmitter arranged within the first package cavity, a first ultrasonic receiver arranged within the first package cavity and acoustically coupled to the first ultrasonic transmitter, a second ultrasonic transmitter arranged within the second package cavity, and a second ultrasonic receiver arranged within the second package cavity and acoustically coupled to the second ultrasonic transmitter.

The ultrasonic touch system 1100A may include the first coupling medium 109-1 that fills or at least partially fills the first package cavity 1101-1, and the second coupling medium 109-1 that fills or at least partially fills the second package cavity 1101-2. The first coupling medium 109-1 may be configured to mechanically and acoustically couple the first touch sensor chip 201-1 to the touch structure 102. The second coupling medium 109-2 may be configured to mechanically and acoustically couple the second touch sensor chip 201-2 to the touch structure 102.

The ultrasonic touch system 1100A further includes the light source 115 configured to produce an activating light. The light source 115 may be arranged on one of the circuit substrates (e.g., the first circuit substrate 108-1) for receiving power signals. The first coupling medium 109-1 may include a first luminescent material that is configured to be activated by the activation light to produce a first backlight that is emitted from the first package cavity 1101-1. The second coupling medium 109-2 may include a second luminescent material that is configured to be activated by the activating light to produce a second backlight that is emitted from the second package cavity 1101-1. The first luminescent material and the second luminescent material may emit light at a same wavelength or at different wavelengths. Thus, the light source 115 may be shared by the first coupling medium 109-1 and the second coupling medium 109-2 for stimulating both the first luminescent material and the second luminescent material simultaneously. The first optically transparent region 202-1 may be transparent to the first backlight such that the first backlight is emitted from the first coupling medium 109-1 into an environment. The second optically transparent region 202-2 may be transparent to the second backlight such that the second backlight is emitted from the second coupling medium 109-2 into the environment.

As indicated above, FIG. 11A is provided as an example. Other examples may differ from what is described with regard to FIG. 11A.

Figure 11B:
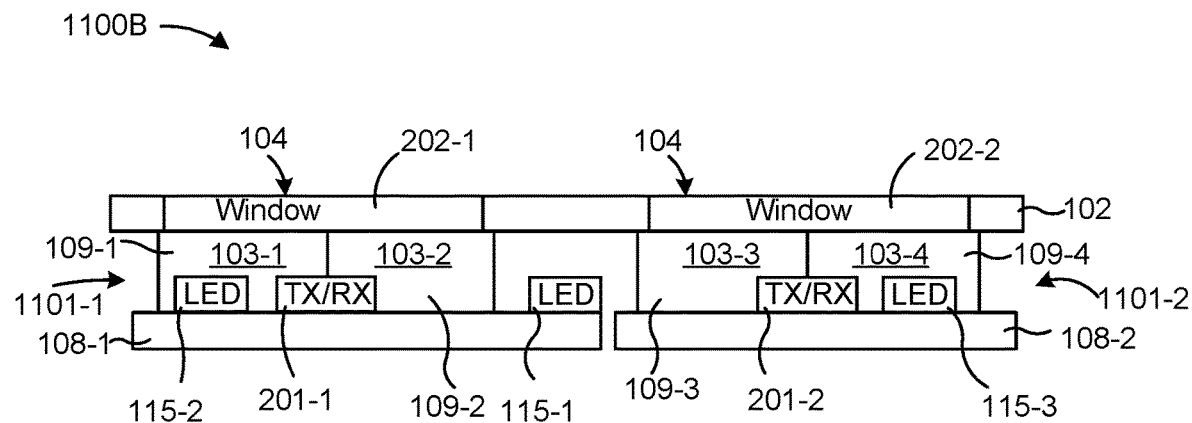
FIG. 11B illustrates a cross-section of an ultrasonic touch system according to one or more implementations.

FIG. 11B illustrates a cross-section of an ultrasonic touch system 1100B according to one or more implementations. The ultrasonic touch system 1100B may be similar to the ultrasonic touch system 1100A described in connection with FIG. 11A. However, the ultrasonic touch system 1100B may include additional light emitting regions and additional light sources. For example, the first package cavity 1101-1 may include a first region 103-1 and a second region 103-2, and the second package cavity 1101-2 includes a third region 103-3 and a fourth region 103-4. A first coupling medium 109-1 including a first luminescent material may fill or at least partially fill the first region 103-1, a second coupling medium 109-2 including a second luminescent material may fill or at least partially fill the second region 103-2, a third coupling medium 109-3 including a third luminescent material may fill or at least partially fill the third region 103-3, and a fourth coupling medium 109-4 including a fourth luminescent material may fill or at least partially fill the fourth region 103-4.

The ultrasonic touch system 1100B may further include a first light source 115-1 arranged between the second region 103-2 and the third region 103-3, a second light source 115-2 arranged in or proximate to the first region 103-1, and a third light source 115-3 arranged in or proximate to the fourth rection 103-4.

The first light source 115-1 may produce a first activating light for simultaneously activating the second luminescent material and the third luminescent material of the second coupling medium 109-2 and the third coupling medium 109-3, respectively, to thereby generate the second backlight and the third backlight. The second light source 115-2 may produce a second activating light for activating the first luminescent material of the first coupling medium 109-1 to thereby generate the first backlight. The third light source 115-3 may produce a third activating light for activating the fourth luminescent material of the fourth coupling medium 109-4 to thereby generate the fourth backlight.

The first backlight and the second backlight may be emitted from the first package cavity 1101-1 through the first optically transparent region 202-1 of the touch structure 102. The third backlight and the fourth backlight may be emitted from the second package cavity 1101-2 through the second optically transparent region 202-2 of the touch structure 102. Thus, touch sensitive areas of the touch structure 102 may be illuminated.

In some implementations, the first region 103-1 and the second region 103-2 may be separated by a first wavelength filter, and the third region 103-3 and the fourth region 103-4 may be separated by a second wavelength filter.

As indicated above, FIG. 11B is provided as an example. Other examples may differ from what is described with regard to FIG. 11B.

Figure 12:
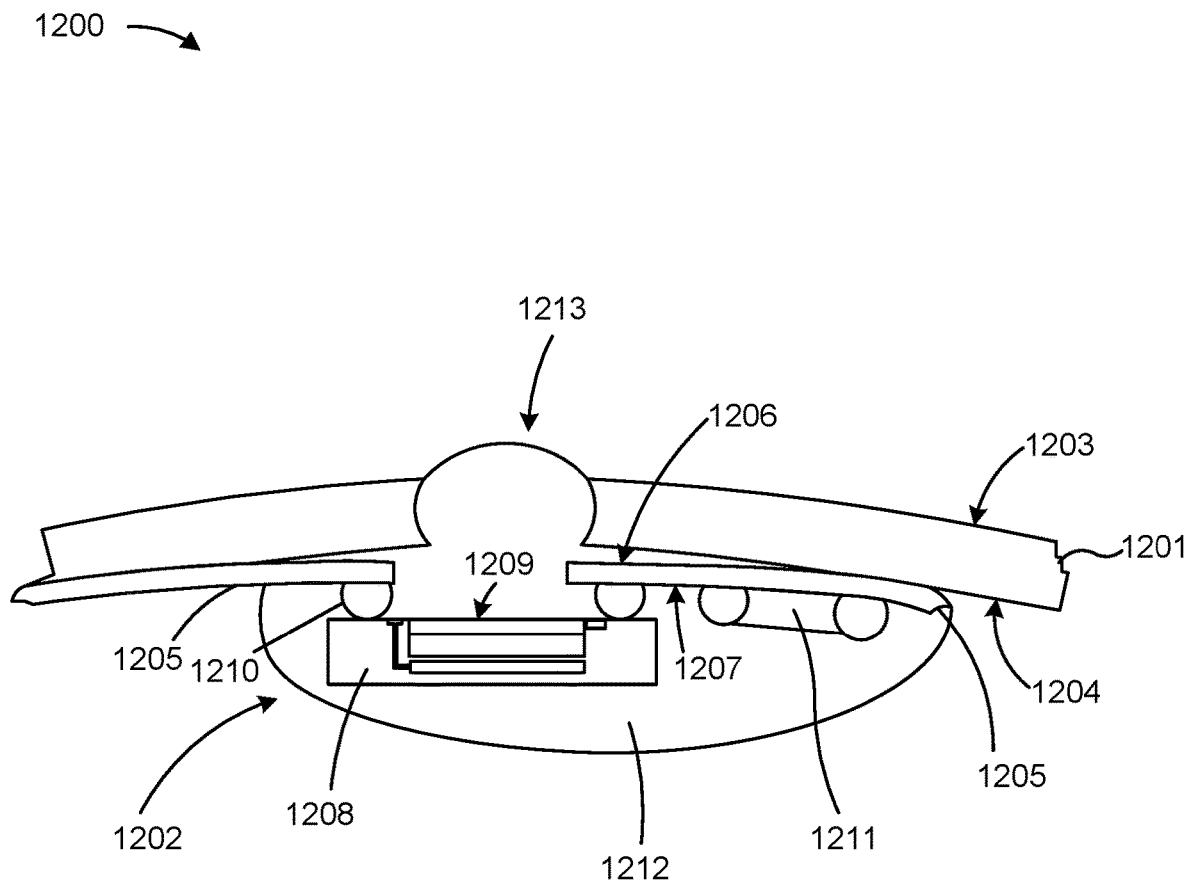
FIG. 12 illustrates a cross-section of an ultrasonic touch sensor according to one or more implementations.

FIG. 12 illustrates a cross-section of an ultrasonic touch sensor 1200 according to one or more implementations. The ultrasonic touch sensor 1200 may include a touch structure 1201 arranged over a package cavity 1202 that is provided in an interior region of the ultrasonic touch sensor 1200. The touch structure 1201 may include a touch surface 1203 and an interior surface 1204.

The ultrasonic touch sensor 1200 may further include a flexible circuit substrate 1205 having a frontside 1206 coupled to the interior surface 1204 of the touch structure 1201 and a backside 1207.

The ultrasonic touch sensor 1200 may further include a touch sensor chip 1208 that includes a transducer transceiver 1209 and is coupled to the backside 1207 of the flexible circuit substrate 1205. In other words, the touch sensor chip 1208 may be mechanically and electrically coupled to the flexible circuit substrate 1205 by one or more electrical interconnects 1210. The transducer transceiver 1209 may be configurable into a transmitting mode or a receiving mode. Thus, when in the transmitting mode, the transducer transceiver 1209 may be configured as an ultrasonic transmitter, and, when in the receiving mode, the transducer transceiver 1209 may be configured as an ultrasonic receiver. When configured as the ultrasonic transmitter, the transducer transceiver 1209 may transmit an ultrasonic transmit wave toward the touch structure 1201. When configured as the ultrasonic receiver, the transducer transceiver 1209 may receive an ultrasonic reflected wave produced by a reflection of the ultrasonic transmit wave at the touch structure 1201 and generate a measurement signal representative of the ultrasonic reflected wave.

The touch sensor chip 1208 may further include a measurement circuit (e.g., the sensor circuit 107) that is coupled to the ultrasonic receiver. The measurement circuit may detect a touch or a non-touch based on the measurement signal.

The ultrasonic touch sensor 1200 may further include a light source 1211 (e.g., an activating light source) coupled to the backside 1207 of the flexible circuit substrate 1205 and configured to produce an activating light.

The ultrasonic touch sensor 1200 may further include a coupling medium 1212 that at least partially fills the package cavity 1202. The coupling medium 1212 may couple the transducer transceiver 1209 (e.g., the ultrasonic transmitter and the ultrasonic receiver) to the touch structure 1201. In addition, the coupling medium 1212 includes a luminescent material that is configured to be activated by the activating light to produce a backlight that is emitted from the package cavity 1202. In some implementations, the coupling medium 1212 couples the frontside 1206 of the flexible circuit substrate 1205 to the interior surface 1204 of the touch structure 1201. In addition, in some implementations, the transducer transceiver 1209 (e.g., the ultrasonic transmitter and the ultrasonic receiver) and the light source 1211 may be encapsulated by the coupling medium 1212.

The touch structure 1201 may include an optically transparent region 1213 that is transparent to the backlight, such that the backlight may be emitted from the ultrasonic touch sensor 1200 into an environment.

As indicated above, FIG. 12 is provided as an example. Other examples may differ from what is described with regard to FIG. 12.

The following provides an overview of some Aspects of the present disclosure:

Aspect 1: An ultrasonic touch sensor, comprising: a housing having a package cavity; an ultrasonic transmitter arranged within the package cavity, wherein the ultrasonic transmitter is configured to transmit an ultrasonic transmit wave; an ultrasonic receiver arranged within the package cavity, wherein the ultrasonic receiver is configured to receive an ultrasonic reflected wave produced by a reflection of the ultrasonic transmit wave and generate a measurement signal representative of the ultrasonic reflected wave; a measurement circuit arranged within the package cavity and coupled to the ultrasonic receiver, wherein the measurement circuit is configured to detect a touch or a non-touch based on the measurement signal; a light source configured to produce an activating light; and a coupling medium that fills or at least partially fills the package cavity, wherein the coupling medium includes a luminescent material that is configured to be activated by the activating light to produce a backlight that is emitted from the package cavity.

Aspect 2: The ultrasonic touch sensor of Aspect 1, wherein the light source is arranged within the package cavity, and wherein the coupling medium encapsulates the ultrasonic transmitter, the ultrasonic receiver, the measurement circuit, and the light source in the package cavity.

Aspect 3: The ultrasonic touch sensor of any of Aspects 1-2, wherein the coupling medium is coupled to the ultrasonic transmitter and the ultrasonic receiver, and wherein the ultrasonic transmitter and the ultrasonic receiver are mechanically coupled and acoustically coupled via the coupling medium.

Aspect 4: The ultrasonic touch sensor of any of Aspects 1-3, wherein the coupling medium is a gel, and wherein the luminescent material includes a photoluminescent material or chemiluminescent material.

Aspect 5: The ultrasonic touch sensor of any of Aspects 1-4, wherein the luminescent material includes a photoluminescent material that includes a fluorescent material, a phosphorescent material, or quantum dots.

Aspect 6: The ultrasonic touch sensor of any of Aspects 1-5, wherein the light source is an ultraviolet light source or a blue light source, and the backlight is a visible light.

Aspect 7: The ultrasonic touch sensor of any of Aspects 1-6, further comprising: a touch structure coupled to the housing and the coupling medium, wherein the touch structure is arranged over the package cavity and includes a touch surface for receiving the touch, wherein the coupling medium couples the ultrasonic transmitter and the ultrasonic receiver to the touch structure, wherein the touch structure includes an optically transparent region that is transparent to the backlight such that the backlight is emitted from the ultrasonic touch sensor through the optically transparent region of the touch structure, wherein the ultrasonic transmitter is configured to transmit the ultrasonic transmit wave toward the touch structure, and wherein the ultrasonic reflected wave is produced by a reflection of the ultrasonic transmit wave at the touch structure.

Aspect 8: The ultrasonic touch sensor of any of Aspects 1-7, wherein the housing includes a package molding and the package cavity is a recess formed in the package molding, and wherein the ultrasonic touch sensor further comprises: a touch structure coupled to the housing and the coupling medium, wherein the touch structure is arranged over the package cavity and includes a touch surface for receiving the touch, and wherein the touch structure includes an optically transparent region that is transparent to the backlight.

Aspect 9: The ultrasonic touch sensor of any of Aspects 1-8, wherein the housing includes a package molding and the package cavity is a cavity defined by the package molding, and wherein the ultrasonic touch sensor further comprises: a touch structure coupled to the housing and the coupling medium, wherein the touch structure is arranged over the package cavity and includes a touch surface for receiving the touch, and wherein the touch structure includes an optically transparent region that is transparent to the backlight.

Aspect 10: The ultrasonic touch sensor of any of Aspects 1-9, wherein the ultrasonic transmitter is a first capacitive micromachined ultrasonic transducer (CMUT) or a first piezoelectric micromachined ultrasonic transducer (PMUT), and wherein the ultrasonic receiver is a second CMUT or a second PMUT.

Aspect 11: The ultrasonic touch sensor of any of Aspects 1-10, wherein the ultrasonic transmitter and the ultrasonic receiver are embodied in a single capacitive micromachined ultrasonic transducer (CMUT) or a single piezoelectric micromachined ultrasonic transducer (PMUT), wherein the single CMUT or the single PMUT is configurable into a transmit mode as the ultrasonic transmitter and into a receive mode as the ultrasonic receiver.

Aspect 12: The ultrasonic touch sensor of any of Aspects 1-11, wherein the light source is a first light source, the activating light produced by the first light source is a first activating light, the coupling medium is a first coupling medium, the luminescent material is a first luminescent material, and the backlight is a first backlight, wherein the ultrasonic touch sensor further comprises: a first wavelength filter that separates the package cavity into a first region and a second region; a second light source configured to produce a second activating light; and a second coupling medium that fills or at least partially fills the second region of the package cavity, wherein the second coupling medium includes a second luminescent material that is configured to be activated by the second activating light to produce a second backlight that is emitted from the package cavity, wherein the first coupling medium fills or at least partially fills the first region of the package cavity, wherein the first wavelength filter is intransparent to the first activating light and the second activating light such that the first wavelength filter blocks the first activating light from entering the second region of the package cavity and blocks the second activating light from entering the first region of the package cavity, and wherein the first wavelength filter is transparent to the first backlight and the second backlight.

Aspect 13: The ultrasonic touch sensor of Aspect 12, further comprising: a second wavelength filter that separates the package cavity into the second region and a third region; a third light source configured to produce a third activating light; and a third coupling medium that fills or at least partially fills the third region of the package cavity, wherein the third coupling medium includes a third luminescent material that is configured to be activated by the third activating light to produce a third backlight that is emitted from the package cavity, wherein the second wavelength filter is intransparent to the second activating light and the third activating light such that the second wavelength filter blocks the second activating light from entering the third region of the package cavity and blocks the third activating light from entering the second region of the package cavity, and wherein the second wavelength filter is transparent to the first backlight, the second backlight, and the third backlight.

Aspect 14: The ultrasonic touch sensor of Aspect 13, wherein the first activating light, the second activating light, and the third activating light are ultraviolet light, wherein the first backlight has a first wavelength corresponding to a first color of visible light, the second backlight has a second wavelength corresponding to a second color of visible light, and the third backlight has a third wavelength corresponding to a third color of visible light, and wherein the first color, the second color, and the third color are different colors.

Aspect 15: The ultrasonic touch sensor of Aspect 14, wherein a first one of the first color, the second color, and the third color is red, a second one of the first color, the second color, and the third color is green, and a third one of the first color, the second color, and the third color is blue.

Aspect 16: The ultrasonic touch sensor of Aspect 12, further comprising: a scatter coupling medium arranged in the package cavity on the first coupling medium and the second coupling medium, wherein the scatter coupling medium is configured to receive the first backlight from the first coupling medium, and spread the first backlight across the package cavity to uniformly emit the first backlight from the package cavity, and wherein the scatter coupling medium is configured to receive the second backlight from the second coupling medium, and spread the second backlight across the package cavity to uniformly emit the second backlight from the package cavity.

Aspect 17: The ultrasonic touch sensor of Aspect 12, wherein the second region surrounds the first region such that the second coupling medium surrounds the first coupling medium.

Aspect 18: The ultrasonic touch sensor of any of Aspects 1-17, wherein the light source is a first light source, the activating light produced by the first light source is a first activating light having a first wavelength, the coupling medium is a first coupling medium, the luminescent material is a first luminescent material, and the backlight is a first backlight, wherein the package cavity includes a first region and a second region, wherein the first coupling medium fills or at least partially fills the first region of the package cavity, wherein the ultrasonic touch sensor further comprises: a second light source configured to produce a second activating light having a second wavelength that is different from the first wavelength; and a second coupling medium that fills or at least partially fills the second region of the package cavity, wherein the second coupling medium includes a second luminescent material that is configured to be activated by the second activating light to produce a second backlight that is emitted from the package cavity, wherein the first luminescent material is not stimulated by the second wavelength, and wherein the second luminescent material is not stimulated by the first wavelength.

Aspect 19: The ultrasonic touch sensor of Aspect 18, wherein the package cavity includes a third region, wherein the ultrasonic touch sensor further comprises: a third light source configured to produce a third activating light having a third wavelength that is different from the first wavelength and the second wavelength; and a third coupling medium that fills or at least partially fills the third region of the package cavity, wherein the third coupling medium includes a third luminescent material that is configured to be activated by the third activating light to produce a third backlight that is emitted from the package cavity, wherein the first luminescent material is not stimulated by the second wavelength or the third wavelength, wherein the second luminescent material is not stimulated by the first wavelength or the third wavelength, and wherein the third luminescent material is not stimulated by the first wavelength or the second wavelength.

Aspect 20: The ultrasonic touch sensor of Aspect 18, further comprising: a scatter coupling medium arranged in the package cavity on the first coupling medium and the second coupling medium, wherein the scatter coupling medium is configured to receive the first backlight from the first coupling medium, and spread the first backlight across the package cavity to uniformly emit the first backlight from the package cavity, and wherein the scatter coupling medium is configured to receive the second backlight from the second coupling medium, and spread the second backlight across the package cavity to uniformly emit the second backlight from the package cavity.

Aspect 21: The ultrasonic touch sensor of Aspect 18, wherein the second region surrounds the first region such that the second coupling medium surrounds the first coupling medium.

Aspect 22: The ultrasonic touch sensor of any of Aspects 1-21, wherein the light source is a first light source, the activating light produced by the first light source is a first activating light, the coupling medium is a first coupling medium, the luminescent material is a first luminescent material, and the backlight is a first backlight, wherein the package cavity includes a first recess and a second recess, wherein the housing includes a package molding that defines the first recess and the second recess, wherein the ultrasonic transmitter is arranged at the first recess and the ultrasonic receiver is arranged at the second recess, wherein the first coupling medium fills or at least partially fills the first recess, and wherein the ultrasonic touch sensor further comprises: a second light source configured to produce a second activating light; and a second coupling medium that fills or at least partially fills the second recess, wherein the second coupling medium includes a second luminescent material that is configured to be activated by the second activating light to produce a second backlight that is emitted from the package cavity.

Aspect 23: An ultrasonic touch system, comprising: a housing having a first package cavity and a second package cavity; a first ultrasonic transmitter arranged within the first package cavity; a first ultrasonic receiver arranged within the first package cavity and acoustically coupled to the first ultrasonic transmitter; a second ultrasonic transmitter arranged within the second package cavity; a second ultrasonic receiver arranged within the second package cavity and acoustically coupled to the second ultrasonic transmitter; a first activating light source configured to produce a first activating light; a first coupling medium that fills or at least partially fills the first package cavity, wherein the first coupling medium includes a first luminescent material that is configured to be activated by the first activation light to produce a first backlight that is emitted from the first package cavity; and a second coupling medium that fills or at least partially fills the second package cavity, wherein the second coupling medium includes a second luminescent material that is configured to be activated by the first activating light to produce a second backlight that is emitted from the second package cavity.

Aspect 24: The ultrasonic touch system of Aspect 23, wherein the first package cavity includes a first region and a second region, wherein the second package cavity includes a third region and a fourth region, wherein the first coupling medium fills or at least partially fills the first region, wherein the second coupling medium fills or at least partially fills the third region, wherein the ultrasonic touch system further comprises: a second activating light source configured to produce a second activating light; a third activating light source configured to produce a third activating light; a third coupling medium that fills or at least partially fills the second region, wherein the third coupling medium includes a third luminescent material that is configured to be activated by the second activation light to produce a third backlight that is emitted from the first package cavity; and a fourth coupling medium that fills or at least partially fills the fourth region, wherein the fourth coupling medium includes a fourth luminescent material that is configured to be activated by the third activating light to produce a fourth backlight that is emitted from the second package cavity.

Aspect 25: The ultrasonic touch system of any of Aspects 23-24, further comprising: a touch structure coupled to the housing, to the first coupling medium, and to the second coupling medium, wherein the touch structure is arranged over the first package cavity and the second package cavity and includes a touch surface for receiving a touch, and wherein the touch structure includes a first optically transparent region that is transparent to the first backlight and a second optically transparent region that is transparent to the second backlight.

Aspect 26: An ultrasonic touch sensor, comprising: a touch structure arranged over a package cavity, wherein the touch structure comprises a touch surface and an interior surface; a flexible circuit substrate having a frontside coupled to the interior surface of the touch structure and a backside; an ultrasonic transmitter coupled to the backside of the flexible circuit substrate and configured to transmit an ultrasonic transmit wave toward the touch structure; an ultrasonic receiver coupled to the backside of the flexible circuit substrate and configured to receive an ultrasonic reflected wave produced by a reflection of the ultrasonic transmit wave at the touch structure and generate a measurement signal representative of the ultrasonic reflected wave; a measurement circuit coupled to the backside of the flexible circuit substrate and coupled to the ultrasonic receiver, wherein the measurement circuit is configured to detect a touch or a non-touch based on the measurement signal; a light source coupled to the backside of the flexible circuit substrate and configured to produce an activating light; and a coupling medium that fills or at least partially fills the package cavity, wherein the coupling medium couples the ultrasonic transmitter and the ultrasonic receiver to the touch structure, and wherein the coupling medium includes a luminescent material that is configured to be activated by the activating light to produce a backlight that is emitted from the package cavity.

Aspect 27: The ultrasonic touch sensor of Aspect 26, wherein the touch structure includes an optically transparent region that is transparent to the backlight.

Aspect 28: The ultrasonic touch sensor of any of Aspects 26-27, wherein the coupling medium couples the frontside of the flexible circuit substrate to the interior surface of the touch structure.

Aspect 29: The ultrasonic touch sensor of any of Aspects 26-28, wherein the ultrasonic transmitter, the ultrasonic receiver, and the light source are encapsulated by the coupling medium.

Aspect 30: A system configured to perform one or more operations recited in one or more of Aspects 1-29.

Aspect 31: An apparatus comprising means for performing one or more operations recited in one or more of Aspects 1-29.

Aspect 32: A non-transitory computer-readable medium storing a set of instructions, the set of instructions comprising one or more instructions that, when executed by a device, cause the device to perform one or more operations recited in one or more of Aspects 1-29.

Aspect 33: A computer program product comprising instructions or code for executing one or more operations recited in one or more of Aspects 1-29.

The foregoing disclosure provides illustration and description, but is not intended to be exhaustive or to limit the implementations to the precise form disclosed. Modifications and variations are possible in light of the above disclosure or may be acquired from practice of the implementations.

Some implementations may be described herein in connection with thresholds. As used herein, "satisfying" a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term "component" is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. An ultrasonic touch sensor, comprising:
    a housing having a package cavity;
    an ultrasonic transmitter arranged within the package cavity, wherein the ultrasonic transmitter is configured to transmit an ultrasonic transmit wave;
    an ultrasonic receiver arranged within the package cavity, wherein the ultrasonic receiver is configured to receive an ultrasonic reflected wave produced by a reflection of the ultrasonic transmit wave and generate a measurement signal representative of the ultrasonic reflected wave;
    a measurement circuit arranged within the package cavity and coupled to the ultrasonic receiver, wherein the measurement circuit is configured to detect a touch or a non-touch based on the measurement signal;
    a light source configured to produce an activating light; and
    a coupling medium that fills or at least partially fills the package cavity, wherein the coupling medium includes a luminescent material that is configured to be activated by the activating light to produce a backlight that is emitted from the package cavity.

2. The ultrasonic touch sensor of claim 1, wherein the light source is arranged within the package cavity, and
    wherein the coupling medium encapsulates the ultrasonic transmitter, the ultrasonic receiver, the measurement circuit, and the light source in the package cavity.

3. The ultrasonic touch sensor of claim 1, wherein the coupling medium is coupled to the ultrasonic transmitter and the ultrasonic receiver, and
    wherein the ultrasonic transmitter and the ultrasonic receiver are mechanically coupled and acoustically coupled via the coupling medium.

4. The ultrasonic touch sensor of claim 1, wherein the coupling medium is a gel, and
    wherein the luminescent material includes a photoluminescent material or chemiluminescent material.

5. The ultrasonic touch sensor of claim 1, wherein the luminescent material includes a photoluminescent material that includes a fluorescent material, a phosphorescent material, or quantum dots.

6. The ultrasonic touch sensor of claim 1, wherein the light source is an ultraviolet light source or a blue light source, and the backlight is a visible light.

7. The ultrasonic touch sensor of claim 1, further comprising:
   a touch structure coupled to the housing and the coupling medium, wherein the touch structure is arranged over the package cavity and includes a touch surface for receiving the touch,
   wherein the coupling medium couples the ultrasonic transmitter and the ultrasonic receiver to the touch structure,
   wherein the touch structure includes an optically transparent region that is transparent to the backlight such that the backlight is emitted from the ultrasonic touch sensor through the optically transparent region of the touch structure,
   wherein the ultrasonic transmitter is configured to transmit the ultrasonic transmit wave toward the touch structure, and
   wherein the ultrasonic reflected wave is produced by a reflection of the ultrasonic transmit wave at the touch structure.

8. The ultrasonic touch sensor of claim 1, wherein the housing includes a package molding and the package cavity is a recess formed in the package molding, and
   wherein the ultrasonic touch sensor further comprises:
   a touch structure coupled to the housing and the coupling medium, wherein the touch structure is arranged over the package cavity and includes a touch surface for receiving the touch, and wherein the touch structure includes an optically transparent region that is transparent to the backlight.

9. The ultrasonic touch sensor of claim 1, wherein the housing includes a package molding and the package cavity is a cavity defined by the package molding, and
   wherein the ultrasonic touch sensor further comprises:
   a touch structure coupled to the housing and the coupling medium, wherein the touch structure is arranged over the package cavity and includes a touch surface for receiving the touch, and wherein the touch structure includes an optically transparent region that is transparent to the backlight.

10. The ultrasonic touch sensor of claim 1, wherein the ultrasonic transmitter is a first capacitive micromachined ultrasonic transducer (CMUT) or a first piezoelectric micromachined ultrasonic transducer (PMUT), and
    wherein the ultrasonic receiver is a second CMUT or a second PMUT.

11. The ultrasonic touch sensor of claim 1, wherein the ultrasonic transmitter and the ultrasonic receiver are embodied in a single capacitive micromachined ultrasonic transducer (CMUT) or a single piezoelectric micromachined ultrasonic transducer (PMUT),
    wherein the single CMUT or the single PMUT is configurable into a transmit mode as the ultrasonic transmitter and into a receive mode as the ultrasonic receiver.

12. The ultrasonic touch sensor of claim 1, wherein the light source is a first light source, the activating light produced by the first light source is a first activating light, the coupling medium is a first coupling medium, the luminescent material is a first luminescent material, and the backlight is a first backlight,
    wherein the ultrasonic touch sensor further comprises:
    a first wavelength filter that separates the package cavity into a first region and a second region;
    a second light source configured to produce a second activating light; and
    a second coupling medium that fills or at least partially fills the second region of the package cavity, wherein the second coupling medium includes a second luminescent material that is configured to be activated by the second activating light to produce a second backlight that is emitted from the package cavity,
    wherein the first coupling medium fills or at least partially fills the first region of the package cavity,
    wherein the first wavelength filter is intransparent to the first activating light and the second activating light such that the first wavelength filter blocks the first activating light from entering the second region of the package cavity and blocks the second activating light from entering the first region of the package cavity, and
    wherein the first wavelength filter is transparent to the first backlight and the second backlight.

13. The ultrasonic touch sensor of claim 12, further comprising:
    a second wavelength filter that separates the package cavity into the second region and a third region;
    a third light source configured to produce a third activating light; and
    a third coupling medium that fills or at least partially fills the third region of the package cavity, wherein the third coupling medium includes a third luminescent material that is configured to be activated by the third activating light to produce a third backlight that is emitted from the package cavity,
    wherein the second wavelength filter is intransparent to the second activating light and the third activating light such that the second wavelength filter blocks the second activating light from entering the third region of the package cavity and blocks the third activating light from entering the second region of the package cavity, and
    wherein the second wavelength filter is transparent to the first backlight, the second backlight, and the third backlight.

14. The ultrasonic touch sensor of claim 13, wherein the first activating light, the second activating light, and the third activating light are ultraviolet light,
    wherein the first backlight has a first wavelength corresponding to a first color of visible light, the second backlight has a second wavelength corresponding to a second color of visible light, and the third backlight has a third wavelength corresponding to a third color of visible light, and
    wherein the first color, the second color, and the third color are different colors.

15. The ultrasonic touch sensor of claim 14, wherein a first one of the first color, the second color, and the third color is red, a second one of the first color, the second color, and the third color is green, and a third one of the first color, the second color, and the third color is blue.

16. The ultrasonic touch sensor of claim 12, further comprising:
    a scatter coupling medium arranged in the package cavity on the first coupling medium and the second coupling medium,
    wherein the scatter coupling medium is configured to receive the first backlight from the first coupling medium, and spread the first backlight across the package cavity to uniformly emit the first backlight from the package cavity, and wherein the scatter coupling medium is configured to receive the second backlight from the second coupling medium, and spread the second backlight across the package cavity to uniformly emit the second backlight from the package cavity.

17. The ultrasonic touch sensor of claim 12, wherein the second region surrounds the first region such that the second coupling medium surrounds the first coupling medium.

18. The ultrasonic touch sensor of claim 1, wherein the light source is a first light source, the activating light produced by the first light source is a first activating light having a first wavelength, the coupling medium is a first coupling medium, the luminescent material is a first luminescent material, and the backlight is a first backlight,
   wherein the package cavity includes a first region and a second region,
   wherein the first coupling medium fills or at least partially fills the first region of the package cavity,
   wherein the ultrasonic touch sensor further comprises:
      a second light source configured to produce a second activating light having a second wavelength that is different from the first wavelength; and
      a second coupling medium that fills or at least partially fills the second region of the package cavity, wherein the second coupling medium includes a second luminescent material that is configured to be activated by the second activating light to produce a second backlight that is emitted from the package cavity,
   wherein the first luminescent material is not stimulated by the second wavelength, and
   wherein the second luminescent material is not stimulated by the first wavelength.

19. The ultrasonic touch sensor of claim 18, wherein the package cavity includes a third region,
   wherein the ultrasonic touch sensor further comprises:
      a third light source configured to produce a third activating light having a third wavelength that is different from the first wavelength and the second wavelength; and
      a third coupling medium that fills or at least partially fills the third region of the package cavity, wherein the third coupling medium includes a third luminescent material that is configured to be activated by the third activating light to produce a third backlight that is emitted from the package cavity,
   wherein the first luminescent material is not stimulated by the second wavelength or the third wavelength,
   wherein the second luminescent material is not stimulated by the first wavelength or the third wavelength, and
   wherein the third luminescent material is not stimulated by the first wavelength or the second wavelength.

20. The ultrasonic touch sensor of claim 18, further comprising:
   a scatter coupling medium arranged in the package cavity on the first coupling medium and the second coupling medium,
   wherein the scatter coupling medium is configured to receive the first backlight from the first coupling medium, and spread the first backlight across the package cavity to uniformly emit the first backlight from the package cavity, and
   wherein the scatter coupling medium is configured to receive the second backlight from the second coupling medium, and spread the second backlight across the package cavity to uniformly emit the second backlight from the package cavity.

21. The ultrasonic touch sensor of claim 18, wherein the second region surrounds the first region such that the second coupling medium surrounds the first coupling medium.

22. The ultrasonic touch sensor of claim 1, wherein the light source is a first light source, the activating light produced by the first light source is a first activating light, the coupling medium is a first coupling medium, the luminescent material is a first luminescent material, and the backlight is a first backlight,
   wherein the package cavity includes a first recess and a second recess,
   wherein the housing includes a package molding that defines the first recess and the second recess,
   wherein the ultrasonic transmitter is arranged at the first recess and the ultrasonic receiver is arranged at the second recess,
   wherein the first coupling medium fills or at least partially fills the first recess, and
   wherein the ultrasonic touch sensor further comprises:
      a second light source configured to produce a second activating light; and
      a second coupling medium that fills or at least partially fills the second recess, wherein the second coupling medium includes a second luminescent material that is configured to be activated by the second activating light to produce a second backlight that is emitted from the package cavity.

23. An ultrasonic touch system, comprising:
   a housing having a first package cavity and a second package cavity;
   a first ultrasonic transmitter arranged within the first package cavity;
   a first ultrasonic receiver arranged within the first package cavity and acoustically coupled to the first ultrasonic transmitter;
   a second ultrasonic transmitter arranged within the second package cavity;
   a second ultrasonic receiver arranged within the second package cavity and acoustically coupled to the second ultrasonic transmitter;
   a first activating light source configured to produce a first activating light;
   a first coupling medium that fills or at least partially fills the first package cavity, wherein the first coupling medium includes a first luminescent material that is configured to be activated by the first activation light to produce a first backlight that is emitted from the first package cavity; and
   a second coupling medium that fills or at least partially fills the second package cavity, wherein the second coupling medium includes a second luminescent material that is configured to be activated by the first activating light to produce a second backlight that is emitted from the second package cavity.

24. The ultrasonic touch system of claim 23, wherein the first package cavity includes a first region and a second region,
   wherein the second package cavity includes a third region and a fourth region,
   wherein the first coupling medium fills or at least partially fills the first region,
   wherein the second coupling medium fills or at least partially fills the third region,
   wherein the ultrasonic touch system further comprises:

a second activating light source configured to produce a second activating light;

a third activating light source configured to produce a third activating light;

a third coupling medium that fills or at least partially fills the second region, wherein the third coupling medium includes a third luminescent material that is configured to be activated by the second activation light to produce a third backlight that is emitted from the first package cavity; and a fourth coupling medium that fills or at least partially fills the fourth region, wherein the fourth coupling medium includes a fourth luminescent material that is configured to be activated by the third activating light to produce a fourth backlight that is emitted from the second package cavity.

25. The ultrasonic touch system of claim 23, further comprising:

a touch structure coupled to the housing, to the first coupling medium, and to the second coupling medium, wherein the touch structure is arranged over the first package cavity and the second package cavity and includes a touch surface for receiving a touch, and wherein the touch structure includes a first optically transparent region that is transparent to the first backlight and a second optically transparent region that is transparent to the second backlight.

* * * * *